(12) United States Patent
Jugovic

(10) Patent No.: US 11,172,046 B2
(45) Date of Patent: Nov. 9, 2021

(54) INTERMEDIATED ACCESS TO ENTITY INFORMATION PROFILES

(71) Applicant: Ernest Jugovic, Pickering (CA)

(72) Inventor: Ernest Jugovic, Pickering (CA)

( * ) Notice: Subject to any disclaimer, the term of this patent is extended or adjusted under 35 U.S.C. 154(b) by 0 days.

(21) Appl. No.: 15/610,075

(22) Filed: May 31, 2017

(65) Prior Publication Data
US 2018/0262591 A1    Sep. 13, 2018

(30) Foreign Application Priority Data
Mar. 9, 2017 (CA) .................................. CA 2960654

(51) Int. Cl.
| | | |
|---|---|---|
| *G06F 15/16* | (2006.01) |
| *H04L 29/08* | (2006.01) |
| *G06F 16/435* | (2019.01) |
| *G06F 16/907* | (2019.01) |
| *G06F 16/21* | (2019.01) |
| *H04L 12/14* | (2006.01) |
| *G06F 16/00* | (2019.01) |

(52) U.S. Cl.
CPC ............ *H04L 67/306* (2013.01); *G06F 16/00* (2019.01); *G06F 16/21* (2019.01); *G06F 16/437* (2019.01); *G06F 16/907* (2019.01); *H04L 12/14* (2013.01)

(58) Field of Classification Search
CPC ....... H04L 12/14; H04L 67/306; G06F 16/00; G06F 16/21; G06F 16/437; G06F 16/907
See application file for complete search history.

(56) References Cited

U.S. PATENT DOCUMENTS

| | | | | |
|---|---|---|---|---|
| 7,734,731 | B2 * | 6/2010 | Ordille .................. | G06F 17/248 709/219 |
| 2003/0078908 | A1 | 4/2003 | Paransky | |
| 2013/0054454 | A1 * | 2/2013 | Purves .................. | H04L 67/306 705/41 |
| 2014/0358972 | A1 * | 12/2014 | Guarrieri ............ | G06F 21/6227 707/781 |
| 2015/0127711 | A1 * | 5/2015 | Livingston .............. | H04L 67/10 709/202 |
| 2015/0324444 | A1 * | 11/2015 | Chercoles S Nchez .................... G06F 16/285 707/703 |

FOREIGN PATENT DOCUMENTS

EP    2150932 A1    2/2010

OTHER PUBLICATIONS

International Search Report Issued in PCT Application No. PCT/CA2017/000096 dated Dec. 8, 2017.

* cited by examiner

*Primary Examiner* — Ryan J Jakovac
(74) *Attorney, Agent, or Firm* — Gearhart Law LLC

(57) ABSTRACT

A profile database contains a plurality of profile records, each made up of at least one subject information element of a subject entity. Subscribers, via subscribed devices, can subscribe to and submit updates to subject information elements of entities contained in the database. The database holds the details of authorized subscriptions to particular subject information elements, and the contents of subscribed information elements are made available to subscriber devices of the authorized subscribers as required. All subscription requests and updates to the profile records are approved on behalf of the related entity.

40 Claims, 12 Drawing Sheets

INTERMEDIATED ACCESS TO ENTITY INFORMATION PROFILES

CLAIM OF PRIORITY

This application claims priority to Canadian Patent Application 2960654 filed on Mar. 9, 2017, the contents of which are fully incorporated by reference in its entirety.

FIELD OF THE EMBODIMENTS

This invention is in the field of contact information management methods, and more specifically deals with a system and method for the provision of subscriber access to contact information profile of entities, wherein the subject entity can authorize the requested access to said profile.

BACKGROUND OF THE EMBODIMENTS

The wide availability of personal IT equipment such as smart phones, tablet computers, laptop computers and the like, has driven technology deeper and deeper into our lives—each website or tool which is used typically requires contact information of the user to set up an account or otherwise transact business. As technology pervades our economy, there is a proliferation of contact information of users that needs to be administered and maintained for use by the electronic systems of businesses and third parties.

As the number of instances of personal or identifying information increases, the complexity of maintaining these information sources is also increased. If it were possible to provide a method of consolidated management of contact information that would limit the number of storage instances for such information and make management and updating of same an easier task, is believed that this would be widely accepted in industry and by individuals.

There have been prior art attempts at the management of contact information across electronic platforms—several companies have delivered products allowing for centralized address book management for example, where a user can synchronize copies of their contact address book for use across multiple platforms. Different electronic systems are connected in such a way that they either all draw upon a single centralized dataset of contact information, or a centralized dataset is used to maintain synchronicity between contact address information used and maintained on multiple platforms. In either case, these prior art attempts at centralized information management are typically only for use by the client/user themselves—i.e. The client connects their own instances of multiple other platforms together to access synchronized and consolidated data. Information intermediation systems which have been created for the specific purpose of centralized management of information for sharing with third parties are less prevalent in the prior art. Creation of a system for centralized and authorized management of an entity information profile, for sharing and use with authorized third parties, is a primary objective of the present invention.

Attempts have been made in the prior art for the distribution of entity information updates to multiple third parties, however those systems are typically intended to provide a single update of information to third parties on manual initiation of same—for example applications which allow for the centralized management of the dispatch of a change of address request or change of address update to multiple vendors. Limitations to these types of systems however include the fact that the actual dispatch of change of information details is manually initiated by the entity, and is a one-way transaction, i.e. it is typically provided to the vendors in a format that requires manual data entry at the vendor end as well. A system that would permit for automated or easily triggered periodic updates or real time information calls in the current profile of the entity, ideally with a data mapping ability, would represent a significant enhancement over the current state of the art.

Other prior art systems allow for authorized third party access to personal profiles or information of an entity but without granularity. An entity providing access to their profile to a third party system typically authorizes complete access to their centralized information. It might be desired to provide more limited access to some third parties than others and as such an information intermediation system that allowed an entity/entity to provide only limited access to certain portions of a central profile would be considered desirable and accepted in the market.

A final shortcoming in prior art systems which is intended to be addressed by the present system is the difficulty or lack of ability of a third party including a subscriber to make changes to the information on file, with authorization, on behalf of the entity. Third parties subscribing to most centralized contact information management services at present cannot submit changes to the centralized subject profile. It would simplify the information management process if it were possible for a third party to submit changes to information profiles, subject to approval by the entity. This is another aspect of information intermediation which is not available in prior art systems, which it is believed would deliver a more robust and commercially attractive solution to centralize information management issues at the current time.

SUMMARY OF THE EMBODIMENTS

As outlined above, the invention comprises a method of providing intermediated access and updates to centrally managed information profiles of subject entities via a computer network. A profile database of entity information is maintained, which includes a plurality of profile records. Each profile record corresponds to a subject entity and contains at least subject information element being a field containing information pertaining to the subject entity. The profile database also contains a plurality of subscription records each of which corresponds to an approved connection between the subscriber and at least one subject information element of a profile record in the profile database. Subject information elements to which there is a subscription represented by a subscription record are subscribed information elements. Subscribers, via subscriber devices, can request access to portions of the database, and all requests to subscribe or update any subject information elements in the database are approved or rejected by the related subject entities.

As outlined elsewhere herein, the subject entities would be selected from the group of individuals, groups of individuals, legal entities or other representative entities. The subject information elements themselves with respect to any type of subject entities might be any type of information selected from the group of information pertaining to a subject entity, which include physical identifiers of the entity, nonphysical identifiers of the entity, vital statistics of the subject entity or customer identifiers of the entity. Any type of information which could be stored in respect of a subject entity could be stored in the profile database and could comprise a subject information element for the purposes of the method of the present invention.

The first step of the method is to provide a profile server which is connected to a network—the profile server in turn, in addition to regular components such as memory, processor etc., comprises a profile database which contains a plurality of profile records, each of which corresponds to a subject entity and contains at least one subject information element being a field containing information pertaining to the subject entity in respect of whom information is maintained in an intermediated fashion in accordance with the method hereof. As outlined elsewhere herein it will be understood to those skilled in the art of software design of this nature, the subject entities might be individuals, groups of individuals, legal entities etc. and any type of a subject entity in respect of whom contact or other similar types of subject entity information can be tracked are contemplated to be within the scope of the terminology of entities as used in the application and in respect of the present invention.

The profile database can have many different types of data structures and any type of a data structure which allows the system and method of the present invention to be executed is within the scope of the profile database terminology used herein and is intended to be covered within the claims of the present invention. The profile database for example could comprise a single data structure consolidated and centrally accessible to the server, or in other cases might comprise multiple distributed data contents which were stored in an unstructured fashion across multiple connected data stores relying upon whatever necessary central database schema was required to monitor and access same. Both such approaches—either a centralized relational database, or a distributed or unstructured database with content stored in multiple locations including on subscriber devices are explicitly contemplated within the scope of the present invention, with any necessary adjustments to the software required to execute the method.

Each profile record in the profile database would likely contain a subject identifier which identified the subject entity of the profile record, as well as at least one subject information element which is a field containing information pertaining to the subject entity. One or more information elements could be tracked in respect of each profile record. The same subject information elements can be tracked in each respective profile record, or in some embodiments of the system and software of the present invention customized sets of subject information elements could be stored and administered in respect of different profile records in the database—that certain profile records might include more or less subject information elements than others.

In the case of unstructured profile databases with material stored in multiple locations, it will be understood that the contents of individual subject information elements might be stored in different locations, using a centrally accessible database schema or instructions accessible to the profile server for the purpose of tracking and maintaining those distributed subject information elements or entity data.

The subject information elements are contemplated specifically to contain identifying entity information of the subject entities related to the profile records—name, address, account numbers, vital statistics etc. Any type of information will be understood can comprise a subject information element as long as it could be captured and stored within a profile record of the profile database as designed in the particular embodiment of the present invention.

In addition to the profile record dataset, the profile database would also include a subscriber record dataset, being a plurality of subscription records each of which corresponds to an approved connection between a subscriber and at least one subject information element of a profile record in the profile database. Each subscription record documents an approved connection between the subscriber and at least one subject information element of a profile record. A subscriber desiring access to the contents of one or more subject information elements in the database with respect to a particular subject entity would which is stored within the profile database could be granted subscription and access to those subscription requests and to the specific subject information element fields, and the subscriber data set or the subscriber records would maintain the details of issued subscriptions.

As in the case of the profile records, the subscription records could also similarly have many different types of data structures—any type of the data structure which accomplishes the objectives outlined herein i.e. maintaining details of approved subscription requests in respect of subscribing entities or subscribers, along with the details of the subscribed information elements which are the approved subject of each request, is contemplated within the scope of the present invention.

The profile server would also include at least one network interface which would enable the profile server to communicate with different third-party devices on the computer network—namely subject entity devices, requester devices and subscriber devices of subject entities, requesters and subscribers respectively. The profile server could also in some embodiments include multiple network interfaces and could act as a bridge between those networks, where the subject entity devices, requester devices or subscriber devices were on different networks.

The next element of the profile server necessary for the execution of the method of the present invention is an intermediation software application capable of executing the required steps of the method of the present invention. The intermediation software application would administer the profile database, as well as being responsible for the receipt and processing of subscription requests from requester devices, seeking to subscribe to at least one subject information element of profile record on behalf of a subscriber, and also would be responsible for the receipt and processing of update requests seeking to post updates or alterations to profile records in the profile database subject to approval from the respective subject entities.

When the profile server received a subscription request from a requester device, which is a request seeking on behalf of a third party seeking to be a subscriber to at least one subject information element of a profile record, the intermediation software application in conjunction with other hardware or software applications accessible to the profile server would initiate the execution of a subscription approval transaction, whereby the subject entity of the subject information elements in respect of which the subscription request is filed would be required to approve or reject the subscription request. A subscription approval transaction would first comprise the identification of a subject entity device of the subject entity associated with the related profile record—likely based upon information stored within the profile database or the profile record itself. A subscription approval request which included the details of the subscription request would be transmitted to the subject entity device, and the subject entity could then transmit a subscription request response back to the server which either approved or refused the subscription request. On receipt of the subscription request response from the subject entity device, if the received rescript subscription request response approved the subscription request, the intermediation software application would facilitate the creation of a subscription record in the profile database detailing the approved connection between the approved subscriber and the subscribed information elements. Subsequent requests by the subscriber via a subscriber device to access the contents of subscribed information elements would then rely upon this subscription record to authorize same. Many different approaches can be taken to the scope of permission granted by the subscription record as well—for example limitations on timing or frequency of availability information or any other different types of modifications or restrictions which might be contemplated or desired to be placed upon a subscriber's ability to access subscribed information elements would be understood to those skilled in the art and are contemplated within the scope of the present invention as well.

In addition to the receipt and processing of subscription requests, the intermediation software application would also facilitate the receipt and handling of profile update requests from requester devices. A profile update request is a request by a requester via their device, to post an update to a profile record either by modifying the subject information elements which are attached to said profile record or their contents. On receipt by the profile server of a profile update request from a requester device, the intermediation software application would initiate the execution of update approval transaction by first identifying a subject entity device of the subject entity associated with the related profile records sought to be updated. Upon identification of the related subject if the device, the intermediation software application would facilitate the transmission of an update approval request including the details of the profile update request to the subject entity device of the subject entity in question, in response to which the subject entity can transmit an update request response back to the server which either approves or refuses the update request.

On receipt of an update approval response from a subject entity device, if the received update approval request approves the profile update request of which it is subject, the intermediation software application would facilitate the posting of the requested modifications from the profile update request to the associated profile record. In cases where a profile update request seeks to update more than one profile record of more than one subject entity, the poll update approval requests could be transmitted by the intermediation software application seeking individual subjectivity approval of the updates sought to be posted to each profile record in question. Similarly, a subscription request could also seek subscription access to the subject information elements of more than one profile record pertaining to more than one subject entity and if that were the case a subscription approval request could also pertain to only an individual profile record but multiple subscription approval request could be dispatched by the intermediation software application to allow for multiple approvals of those different elements of a single subscription request to be approved by each individual affected subject entity.

As outlined a profile update request could either be a request to modify the data stored within a particular subject information element, or in some cases the requester even including the subject entity themselves could provide a profile update request to add additional subject information elements to their profile record i.e. to alter the fields which are maintained in respect of the profile record in question. Both such approaches or steps are contemplated within the scope of the present invention.

The final step in the overall method of the present invention is that the intermediation software application would also facilitate the extraction and transmission of relevant subscribed information element contents to subscriber devices on detection by the profile server of the existence of an information retrieval condition. Once a subscription record was created which authorized access by a particular subscriber to particular subscribed information elements in the profile database, the profile server and the intermediation software application could provide access to the contents of those particular fields as called or requested by a subscriber device, or could transmit on a periodic or ad hoc basis the contents of subscribed information elements to the subscriber devices authorized for access to same. The profile server in the intermediation software application would in conjunction with each other monitor and seek to detect the existence of an information retrieval condition, which might either be an individual call or request for subscribed information from a subscriber device, a periodic frequency of updates, or many different types of data update methodologies all of which are easily understood to those skilled in the art of the design of such systems and all of which again are contemplated within the scope of the present invention. Many different types of reporting or data access which could be facilitated in accordance with the remainder of the present invention are all contemplated within the scope hereof.

Subscription requests and profile update requests transmitted to the profile server and received for processing their own would all require approval or acceptance by the related subject entity, in advance of either allowing a subscription to a particular subject information element or before allowing the posting of requested changes to a profile record in the database. As such, the subject entity maintains control over the degree of access or granularity which is provided to each individual subscriber of their subject entity data, as well as maintaining primary responsibility and control over the duration of the subject entity data stored within their profile record to ensure its accuracy.

As outlined elsewhere herein, the subject or subscription request or a profile update request could pertain to access or updates to one or more subject information elements of one or more subject entities at the same time. Though such approaches are contemplated within the scope of the present invention. In order to maintain the intermediate approach to the handling of information stored within the profile database it would be necessary where subscription requester profile update request pertained to subject information elements of more than one subject and to the that multiple subscription approval transactions or update approval transactions would need to be initiated by the profile server and the intermediation software applications so that each individual subject entity maintain approval over access to or updating of their information.

Multiple subscribing entities or subscribers might be subscribed to a particular individual subject information element of a profile record in the profile database. For example, where subject information elements stored within a profile record in the profile database are address information or the like with respect to a particular subject entity, more than one vendor dealing with a particular subject entity might seek to subscribe to the same subject information elements.

As outlined in generality above, many different types of information retrieval conditions could occasion the dispatch by the profile server and intermediation software application of the contents of one or more subject information element fields to a subscriber device. Information retrieval conditions might include receipt by the profile server of a retrieval request from the subscriber device, or a subject entity device, the retrieval request. The profile server might also determine based upon software executed there on the existence of a predefined information retrieval condition which might include arrival of a particular predetermined frequency, receipt of a request for information from the subscriber or subject entity device, or any number of other different types of database triggers which could be used. Finally, in some embodiments it is contemplated that any time that the profile update request was completed which resulted in the posting of an update to a particular subject information element, it may be desired to create an embodiment of the system of the present invention in which upon any change to the contents of subscribed information elements, the contents of those changed subscribed information elements would be dispatched to subscriber devices and subscribing entities.

In some embodiments of the system of the present invention, subject information elements could be selected when a profile record was created from a group of templates of profile records are templated individual subject information elements or field types. This would allow the subject entity or another party including a subscriber or another requesting third-party, to quickly adapt the format of a profile record in the profile database to maintain the necessary or required information and allow for its access by authorized subscribers and subscriber devices. The template subject information elements could either all be attached to a profile record at the time of its creation or in some embodiments could also be added to a profile record after its creation—for example a particular vendor or other type of the subscriber might need to track additional fields are types of customer information and they could request through the submission of the profile update request to the server the addition of an additional template subject information element to the profile record in question which if approved would allow for the tracking of an additional field and placed in a specific content therein.

In addition to the provision in certain embodiments of the ability to add templated subject information elements to a profile record, other embodiments of the system of the present invention might also allow for the addition of custom subject information elements—that a subject entity or a requesting party could create a non-templated and customized field in the database for maintenance with respect to a profile record.

In some embodiments, the profile server might be a Web server with the network connecting to the profile server being the Internet. In the case of the profile server being a Web server, profile server can interact with subject entity devices, requester devices and subscriber devices over the Internet via a web interface through a browser or client application of some type. In other embodiments, the profile server might be a server connected to another type of a wide-area network allowing for communication with remote devices—the remote devices might include a subject entity software application which would facilitate interaction with the profile server in the creation and maintenance of profile records or subscription records by devices and requests.

In certain embodiments of the present invention, once a subscription is created resulting in the creation of a subscription record in the EE profile database, a subscriber device used by a subscriber to access subscribed information elements might be a subscriber server capable of communication with the profile server.

A requester of a subscription request for a profile update request could either be a subject entity, subscriber or some other third party. All such parties could be accommodated in accordance with the remainder of the method of the present invention, since no subscription would be permitted and no updates would be applied to the profile database without the approval of the subject entity.

In certain cases, when a subscription record is created, detailing a subscription by a subscriber to subscribed information elements, the subscription record might also include additional field mapping information between the subscribed information elements and information fields maintained on a subscriber device etc. It will be understood that like the ability to add or create customized subject information elements in profile records in the database, the system and method of the present invention can also provide for customization or the modification of the content of various subscription records as required to contain all the necessary information to allow for the practice of method of the present invention by subscribers in accessing subscribed information elements.

In some embodiments of the method of the present invention, the profile database could also include a dataset of requester details which would allow for automatic or pre-authorized approval of subscription requests or profile update requests from certain preauthorized requesters. The addition of a plurality of requester records to the profile database for use in this way or for any other purpose to facilitate different modifications to the overarching invention and method will all be contemplated and understood to be within the scope of the present invention. In the context of preauthorization, a subject entity could preset authorization parameters to allow certain subscribers or requesters to automatically gain access as requested to certain profile record information without the need for specific subscription approval requests or update approval requests to be dispatched in the context of a approval transaction to a subject entity device. Individual approval of these requests can be applied by the intermediation software application based upon preauthorization details stored within such requester records.

An additional enhancement which can be made to the system of the present invention would be the inclusion of audit trail functionality in conjunction with the profile database and the intermediation software application whereby the details of the handling of any subscription requests or profile update requests and updates applied to the profile database could all be stored for subsequent query and reporting.

In addition to the intermediation method of the present invention, there is also disclosed an intermediation software application for use in providing intermediated access and updates to centrally maintained information profiles of subject entities via a computer network. That software application comprises processor instructions to cause the hardware of a profile server on a computer network to undertake and administer several functions, including the ability to administer a profile database which contains a plurality of profile records each of which corresponds to a subject entity—each profile record contains at least one subject information element being a field containing information pertaining to the subject entity. The profile database also comprises a plurality of subscription records each of which corresponds to an approved connection between a subscriber and at least one subject information element of a profile record in the profile database—subject information elements to which a subscriber is subscribed are subscribed information elements.

In addition to administering the profile database, the intermediation software application in operation on the profile server will also facilitate the communication of the server with subject entity devices, requester devices and subscriber devices all of which are connected to the computer network by at least one network interface of the profile server. Upon receipt by the profile server of a subscription request from a requester device—which is a request seeking on behalf of an entity seeking to be a subscriber of at least one subject information element of a profile record, the intermediation software application will facilitate the execution of a subscription approval transaction by identifying a subject entity device of the subject entity associated with the related profile record, and transmitting a subscription approval request including the details of the subscription request to that subject entity device. The subscription approval request will be transmitted and facilitates a step in which in response to the subscription approval request a subject entity can transmit a subscription request response back to the server which either approves or refuses the subscription request. When the intermediation software application receives, via the profile server and its network interface, a subscription request response, if the subscription request response that is received approves the subscription request, the intermediation software application will facilitate the creation of a subscription record detailing the approved connection between the approved subscriber and the subscribed information elements in question.

In addition to facilitating subscription requests from potential subscriber entities, the intermediation software application will also facilitate the handling of profile update requests from requester devices to the server via the computer network. A profile update request is a request by a requester to post an update to a profile record by modifying the subject information elements attached to that record or their contents. When the profile server via the computer network receives a profile update request, the intermediation software application will execute an update approval transaction, as outlined in accordance with the method of the present invention, by identifying a subject entity device of the subject entity associated with the related profile record to which the update is desired to be posted, and facilitating the transmission of an update approval request including the details of the profile update request to the subject entity device in question. The update approval request will allow the subject entity to either approve or refuse the update request in a responding transmission.

When the profile server via the network and its network interface receives an update approval response from the subject entity device in response to an update approval request, if the update approval response received approves the update request from the requester entity, the modifications requested in the profile update requesting question will be posted in respect of the associated profile record.

In addition to facilitating subscription requests and update requests, the intermediation software application will also, on detection by the software and the server of the existence of an information retrieval condition, extract the contents of at least one subscribed information element and transmit same to at least one subscriber device. The information retrieval condition can comprise many different conditions as outlined in the remainder of the application contained herein.

The intermediation software application of the present invention can facilitate the administration of a profile database which was a single data structure connected or resident on the profile server, or in other cases, the profile database might be an unstructured form of data with a central schema, which might even be hosted on multiple servers on or off of the same local area network as the profile server. Both such approaches are contemplated within the scope of the present invention. In the case of a distributed data set, portions of the database could be resident on multiple host devices accessible to the profile server via the network, with a centralized data schema or processor instructions as might be required to allow the profile server and the intermediation software application to access and update fat distributed dataset. In the case of the distributed data set on multiple host devices, at least one of those post devices might actually be a subscriber device or a subject entity device, in the context of the remainder the invention.

As outlined above with respect to the method and the intermediation software application of the present invention, the detection of an information retrieval condition could comprise many different conditions, all of which would be understood to those skilled in the art of such programming and are contemplated within the scope of the present invention. Detection of an information retrieval condition could for example comprise receipt by the profile server of a retrieval request from a subscriber device or a subject entity device i.e. a subscriber or subject entity could trigger a retrieval of information from the database by transmitting a retrieval request to the server and the intermediation software application. In other circumstances, where a manual initiation was not required or was not desired, the intermediation software application could determine the existence of a predefined information retrieval condition—for example a database value, a time or frequency of dispatch of up-to-date information etc. Yet another type of information retrieval condition which is contemplated would be that an information retrieval condition can be determined to exist, resulting in the extraction and dispatch of up-to-date information from the profile database to subscriber devices, upon the completion of the posting of a profile update request to a subject information element. If this resulted in the transmission of any changed subscribed information elements to subscriber devices were subscribing entities, those changed elements or additional contents of the profile records in question could be transmitted by the intermediation software application to subscribe devices.

As outlined with respect to the method, the intermediation software application can be programmed to accept and process subscription requests pertaining to one or more subject information elements of one or more profile records.

The intermediation software application could, in the context of update requests, handle both the posting of updates to existing subject information element fields in the database or the addition of additional subject information element fields to the database by an update request. Subject information elements can be added to a profile record after its creation in such a circumstance.

Many different approaches could be taken to the programming or addition of subject information elements to records in the database—for example a group of template subject information elements could be maintained on the server and could be used on an ongoing basis to add or adjust subject to what information elements contained therein. In other cases, in addition to or in the place of the use of a group of template subject information elements, the intermediation software application could also facilitate the creation of custom subject information element fields for storage in respect of an individual profile record. Both such approaches are contemplated within the scope of the present invention.

A subscription record in the database could include a field map between the subscribed information elements of the subscriber and information fields maintained on a subscriber device—the storage and maintenance of such a field map component could be facilitated by the remainder of the intermediation software application.

The intermediation software application could receive and handle profile update requests which were originated by several different parties including a subject entity themselves wishing to maintain or update their profile record, a subscriber, or an unrelated third party.

If a profile update request contained updates for more than one profile record, the intermediation software application could parse the profile update request into multiple individual sets of update requests in respect of each profile record in question, such that each related subject entity could approve or reject the portion of the profile update request pertaining to their information.

The intermediation software application might also administer a requester database contained within the profile server, which contained preauthorization details for certain requesters—this would allow for the automatic approval of subscription or profile update requests received from pre-authorized requesters. The specific nature of the programming required to implement this type of up credential system or the like will be understood to those skilled in the art and is contemplated within the scope of the present invention regard with it but of its implementation.

The intermediation software application might also maintain an audit log with respect to any changes to any subject information elements and profile records in the profile database.

In addition to the method and software application of the present invention, there is also disclosed a profile database for the provision of intermediated information elements of subject entities to permitted subscribers. The database would be capable of connection to a subscriber device via a profile server connected to the same computer network which contained intermediation software applications capable of managing the database. The database would be the profile database as otherwise outlined herein, comprising a plurality of profile records each corresponding to a subject entity and containing at least one subject information element being a field containing information pertaining to the subject entity, and a plurality of subscription records each of which corresponds to an approved connection between subscriber and at least one subject information element of a profile record in the profile database, which are subscribed information elements. The database could be used in the execution of an intermediation method which included the execution of subscription approval transactions in respect of description requests received by the profile server from requester devices, the processing and potential posting of profile updates based on profile update requests transmitted to the server by requester devices and handled in accordance with the remainder of the present invention outlined herein, as well as wherein the contents of at least one subscribing outlined in the database to be provided to a subscriber device upon determination of the existence of an information retrieval condition by intermediation software applications resident on the server hosting the database. The database could comprise a single data structure connected to or resident on the profile server, or in other cases could be a distributed dataset with portions of the database resident on multiple host devices. The database as outlined elsewhere herein would comprise any data structure capable of facilitating the practice of the method of the present invention.

The profile server configured with intermediation software application and related database outlined herein which would allow for the implementation of the method of the present invention communication with remote devices of entities, requesters and subscribing entities, is also contemplated within the scope of the present invention.

DESCRIPTION OF THE DRAWINGS

Selected preferred embodiments of the present invention will now be described with reference to the accompanying drawings. In the accompanying drawings.

DETAILED DESCRIPTION OF ILLUSTRATED EMBODIMENTS

Figure 1:
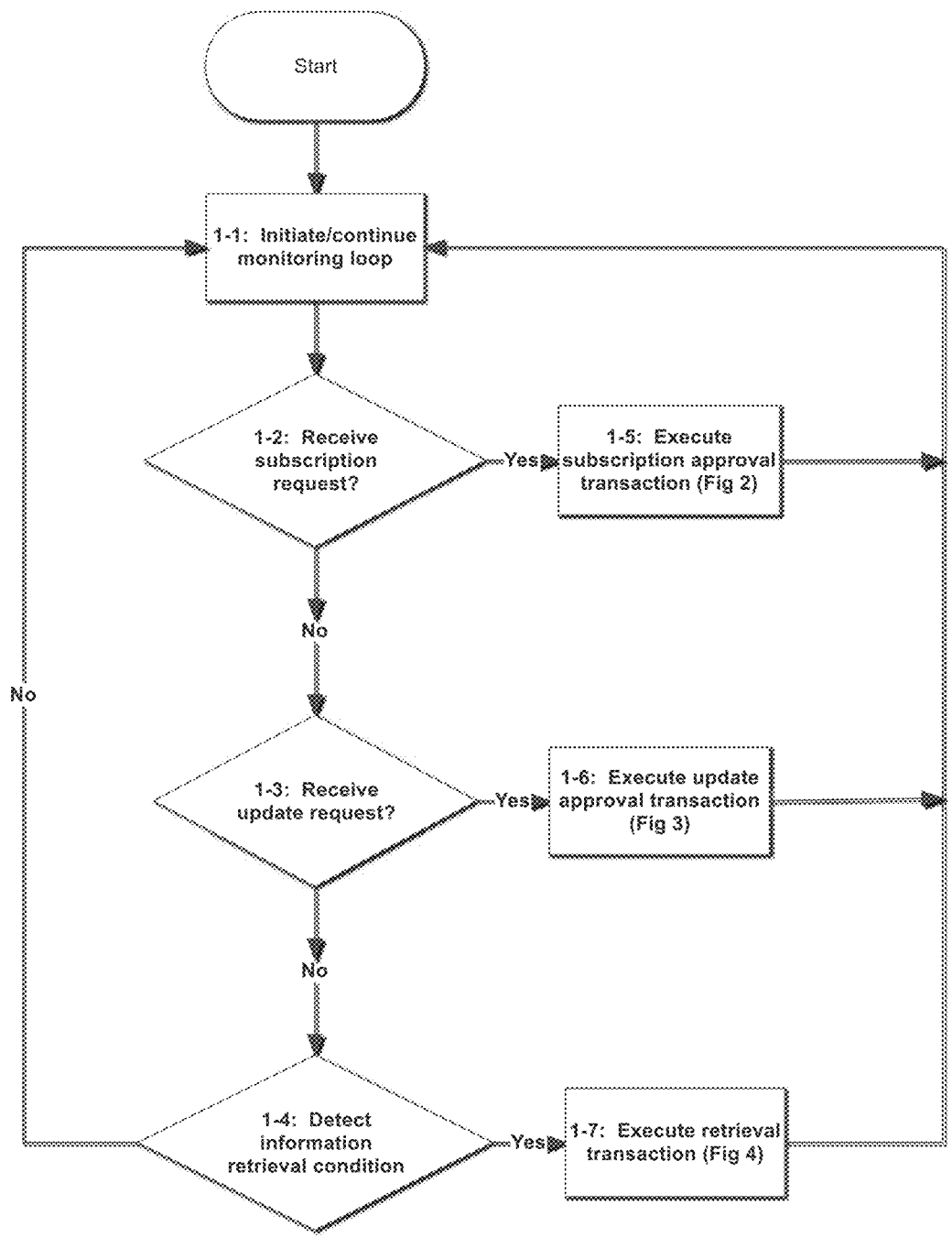
FIG. 1 is a flowchart demonstrating from a high level the steps involved in one embodiment of the business method of the present invention.

As outlined above, the invention consists of a method of providing intermediated access to centrally maintain information profiles entities via a computer network. A profile database contains a plurality of profile records each containing identifying information of a particular entity, including at least one subject information element. Parties seeking to subscribe to the contents of a profile record can initiate a subscription request to a profile server in accordance with the invention, and if the subscription request is approved by the subject entity of the profile record sought to be accessed, that subscribing party can be granted access to the subject information elements in question. Third parties can also submit information updates for storage to entity subject information elements stored in a profile in the profile database—each update would need to be approved by the entity associated with the profile record in question before its storage to the database.

Entities:

There are at least three different types of entities which would participate in the method of the present invention. The first type of an entity which is contemplated is a subject entity, which is the individual or other entity in respect and on behalf of whom intermediated information management and distribution in accordance with the remainder of the method of the present invention will be provided. A subject entity could comprise an individual or some other type of a legal entity on behalf of whom it was desired to manage a profile and information. Subject entities will need to be able to provide approvals of subscription requests and profile update requests in respect of their information on the system. If a subject entity is not an individual, the subject entity would have at least one managing individual associated therewith, for managing these requests for data intermediation transactions.

Each subject entity would likely receive subscription approval requests and update approval requests, as well as interacting with the remainder of the system of the present invention for hands-on management of the content of their profile record in the profile database, from at least one subject entity device. The subject entity device would comprise any type of a device that could interact with the intermediation software application of the present invention. Many different types of entity interface software and methods will be understood to those skilled in the art of client/server software design and all such approaches are contemplated within the scope of the present invention insofar as they do not depart from the overall scope and intention of the method outlined herein.

In addition to subject entities, whose information will be managed and distributed in accordance with the intermediation method outlined herein, the next type of an entity which is described in the remainder of the present invention is a requester. A requester is any entity, including a subscriber or some other type of a third party, who might request subscription access to at least one subject information element of a subject entity stored within the profile database, or who might seek to provide updates to information stored in at least one subject information element of a profile record in the profile database. Like subject entities, where a requester per se was a legal entity and not an individual, a managing individual would potentially represent the legal entity for interacting with the system through a requester device.

If a requester initiated the filing of a subscription request of the profile server of the present invention on their own behalf, if that subscription request were approved by the subject entity, the requester becomes a subscriber. It will be understood however that a requester may file either a subscription request for a profile update request on their own behalf or on behalf of a third party and that the system and method of the present invention can accommodate both approaches and in fact is explicitly designed to allow for intermediated submission of updates and intermediated subscription access to the information of entity entities stored within the profile database as otherwise outlined herein.

As outlined with respect to subject entities, requesters would interact with the profile server of the present invention via requester devices—a requester device might contain client software specifically designed for the purpose of interacting with the intermediation software application, or in other cases a browser type client/server interface can be used—again any type of a requester device and a requester device interface which would allow for the general execution of the method of the present invention will be understood to be within the scope of the present invention.

The third type of an entity which it is necessary to describe for enabling the remainder of the method of the present invention are subscribers and subscriber devices related thereto. A subscriber is an entity to whom subscription access to one or more subject information elements of a profile record in the profile database was granted. As with requesters and subject entities, subscribers could be individuals or legal entities. A subscriber who wished to gain subscription access to subject information elements of a profile record in the profile database would likely be a vendor or business related party to the subject entity in question, who wished to subscribe to access to up-to-date contents of subject information elements related to the subject entity.

Each subscriber would be associated with at least one subscriber device—the subscriber devices would be network connected devices affiliated with subscribers, who were in position to receive the contents of subscribed information elements from the profile database as required—either upon a call to the database for up-to-date information or on a periodic basis. It is specifically contemplated that most subscriber devices would actually constitute online business systems or profile servers of subscribers, with the necessary software installed thereon to communicate with profile server for the purpose of calling or receiving subscribed information element contents from time to time as well as in certain embodiments providing profile update requests to the profile server and the intermediation software application installed thereon for the purpose of intermediated updating of the central profile record of the subject entity.

Where a requester initiates a subscription request on their own behalf, where that subscription request is approved the requester becomes a subscriber. In other cases, requesters might request subscription access on behalf of a third party, and providing an interface for both types of subscription requests will be understood to those skilled in the art of related software design and are both contemplated within the scope of the present invention. In certain cases when a subscription is granted to a subscriber to one or more subject information elements, the subscription might be explicitly associated with one or more subscriber devices and in other cases the subscription record related to the subscription being granted might enable access by a subscriber from multiple subscriber devices upon provision of the appropriate authentication credentials etc. to the intermediation software application.

Subject Information Elements:

The method of the present invention provides a means of intermediated access and updating of entity information of subject entities in a centrally managed database. The entity information which it is envisioned would be maintained in accordance with such a system includes address information, identifying information, or any other information of a subject entity which it might be desired to provide access to for third parties—in a commercial context some of the most common information which it is contemplated would comprise entity information for intermediated management in accordance with the remainder of the present invention would include address and accounting information, which might be used by subject entities in respect of multiple identities or account profiles across multiple platforms, and it might be desired to provide intermediated access and updates to the same. Any type of information proprietary to a subject entity which could be stored within a data structure such as the profile database outlined herein is contemplated to be within the scope of the type of information intended to be encompassed by the intermediated management method outlined herein. Each item of information maintained within a profile record in the profile database comprises a subject information element.

Each subject information element is contemplated to be a database field which could hold individual items of information pertaining to the subject entity in question—some subject information elements would be used widely by a subject entity such as their address or similar information, and other subject information elements may be created on a more ad hoc or individual subscription basis. Again as outlined above with respect to the entity information itself, any type of a subject information element database field to be created which might be useful to one or more subscribers in accessing the entity information of a particular subject entity and it will be understood that any type of a subject information element or database field of this nature which can be created in a data structure such as the profile database outlined herein is contemplated within the scope of the present invention. Subject information elements could be of different types of data—some could be numerical, some could be text based, some could be images, and others could be videos or more complicated data structures stored within a record of a database. Any type of information which can be captured in respect of a subject entity in which it could be represented in a database field as will be understood to those skilled in the art of database design will be understood to be within the scope of subject information elements as otherwise outlined herein.

Method Overview:

A profile server would facilitate the intermediated administration and the access to entity information stored as subject information elements with respect to entities in a profile database thereon. The method is accomplished providing a profile server operatively connected to a network. The profile server includes an intermediation software application capable of administering the relevant data and facilitating the remainder of the method of the present invention in communication with entity devices, requester devices and subscriber devices on the network.

The profile server would also comprise locally or by connection a profile database consisting of at least one profile record corresponding to a subject entity—each profile record would include at least one subject information element being a field containing information pertaining to the subject entity. In addition to the profile database, the system and the profile server would also comprise or connect to a subscription database containing a plurality of subscription records, each of which would represent an approved access or connection between a subscriber and at least one subject information element of a subject entity.

Referring to FIG. 1 there is shown a flowchart demonstrating the high-level steps of the method of the present invention. The profile server, operatively connected to the profile database and subscription database via the intermediation software application as otherwise outlined above, would effectively initiate or continue a monitoring loop, shown at 1-1. The monitoring loop is effectively a repeating loop in which the steps of processing requests and conditions as further outlined below is repeated. The monitoring loop could be infinite, or could be stopped by the intermediation software application or other aspect of the method as required. Use of a continuous loop such as this will be understood to only be one approach which could be taken to delivery of a system which would execute the method of the present invention on an ongoing basis and all such modifications as are obvious to those skilled in the art of program design is again contemplated within the scope of the present invention.

Within the monitoring loop, the intermediation software application would listen, via the network interface of the profile server or otherwise, for subscription requests and update requests from network devices. Listening for the receipt of a subscription request is shown at block 1-2 of the method. Where a subscription request was received, the intermediation software application would execute a subscription transaction—shown at 1-5 with the breakout to sub-FIG. 2. As will be described in further detail below, the subscription transaction described in FIG. 2 effectively comprises seeking approval from the subject entity of one or more subject information elements to which a subscription request pertains, by which a subscription will either be approved and granted or not.

A profile update request is a request transmitted from a requester device to the profile server seeking to post an update to at least one subject information element of a profile record in the profile database. The listener for a profile update request is shown at step 1-3. If a profile update request is detected by the intermediation software application, an update transaction would be executed, as shown at step 1-6 (directing to sub-FIG. 3).

As will be described in further detail below, the update transaction described in FIG. 3 effectively comprises seeking approval from a subject entity to post one or more subject information element updates to a profile record to which a particular profile update request pertains, and if the update approval request transmitted to the associated entity device is approved, the updates included in the profile update request from the requester device would be applied and saved to the necessary profile record or records in the profile database. If the update approval request was rejected by the subject entity, the updates contained within the profile update request would not be applied to the profile record in question.

In addition to detection of the receipt of a subscription request or a profile update request by the profile server from a remote device, the method also encompasses the detection of an information retrieval condition, shown at FIG. 1-4. An information retrieval condition would be the detection by the intermediation software application of the existence of a condition in which the contents of subscribed information elements should be provided to one or more subscriber devices. An information retrieval condition might comprise a request from a subscriber device for access to the updated contents of subscribed information elements, or in other cases the information retrieval condition might be the detection or arrival of a periodic timeframe within which the contents of subscribed information elements were to be retrieved and supplied to subscriber devices of the subscribers subscribed to those subscribed information elements. FIG. 1-7 shows the steps in one retrieval transaction.

Following these three listening steps, the loop shown in FIG. 1 is shown to continue.

As outlined above, there will be many ways understood to those skilled in the art of software design, in areas such as this, to yield a ongoing monitoring application such as is contemplated here, and any modifications of the method and apparatus of the present invention to accommodate the overall execution from a high level of the method outlined above is contemplated within the scope of the present invention. We will now review in further detail below, further details of the specific transaction methods and demonstrative components and architecture to be used in the system of the present invention.

Figure 5:
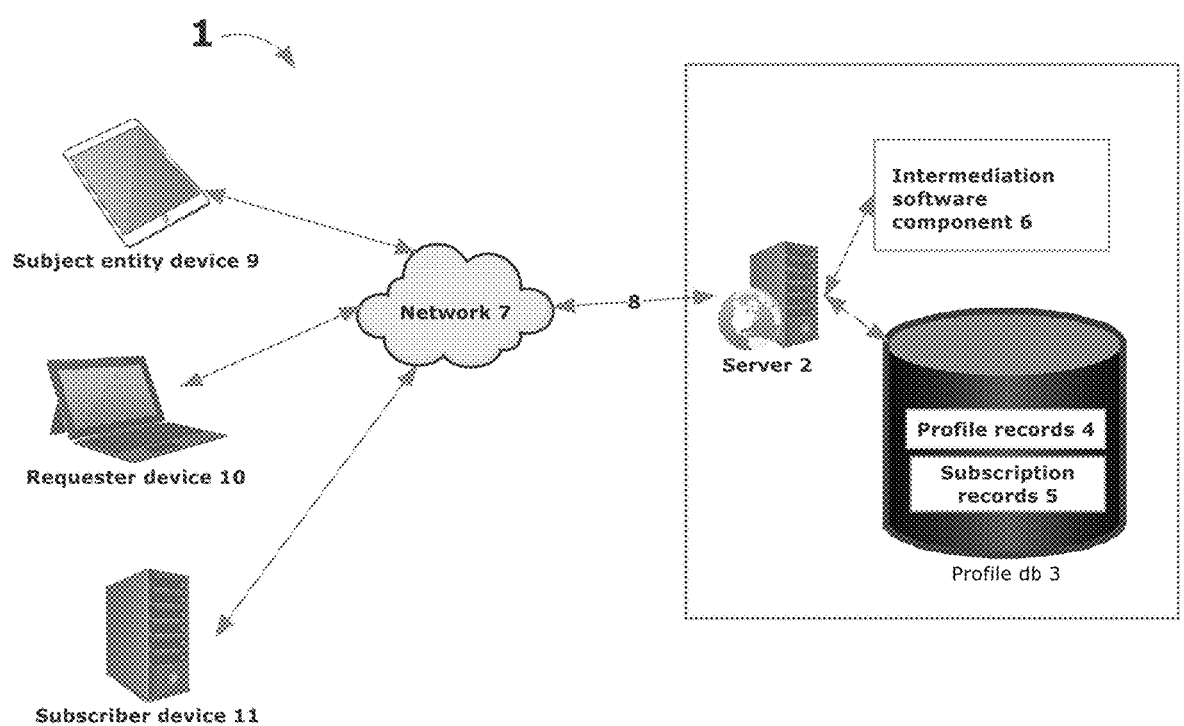
FIG. 5 is a schematic diagram showing one example of a system architecture in accordance with the present invention, which for demonstrative purposes shows a profile database being a locally hosted data structure on the profile server.
Figure 6:
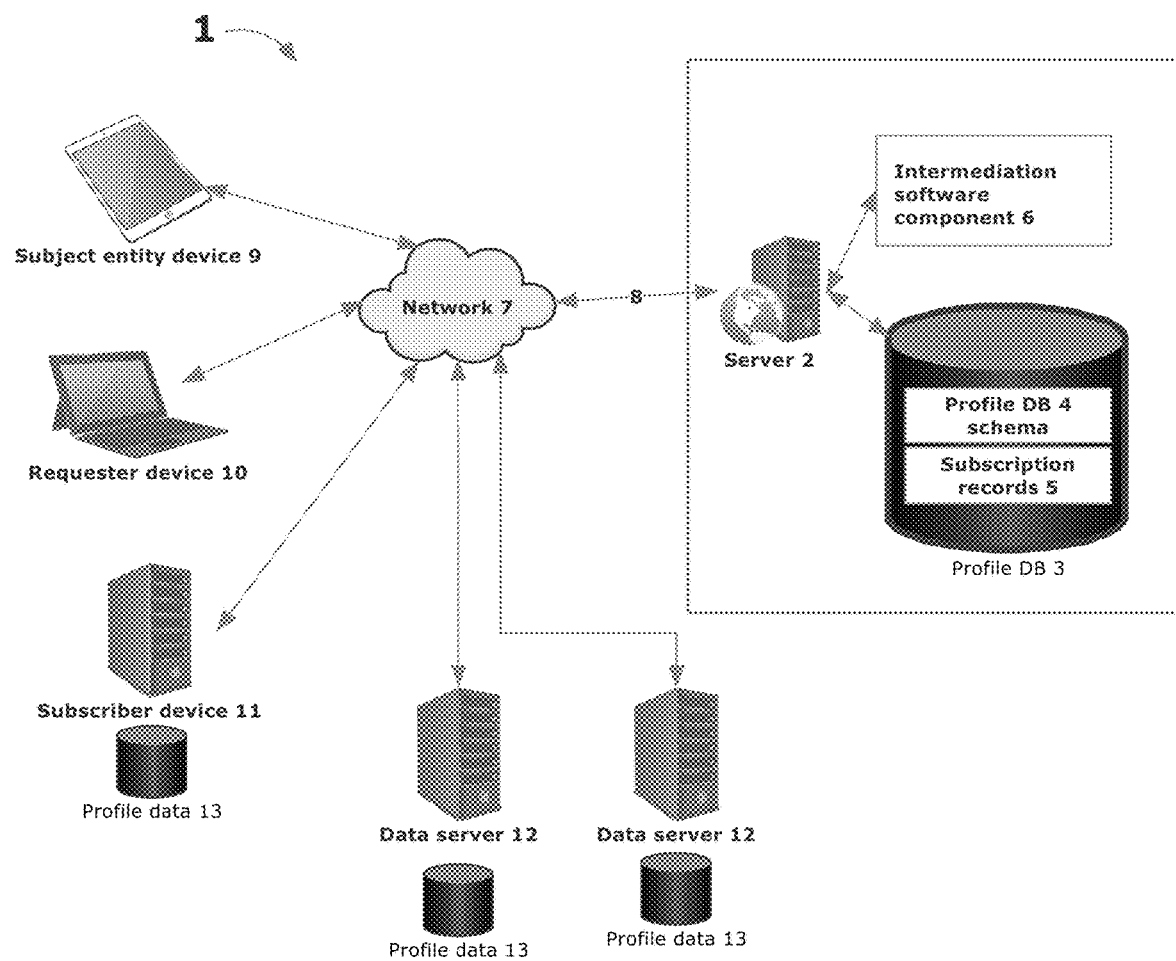
FIG. 6 is a schematic diagram showing a second example of an architecture of a system in accordance with an embodiment of the present invention, in which the profile database is a distributed dataset contained on multiple network devices.

Illustrative Environment and System Architecture:

FIGS. 5 and 6 showed two different system architectures of a network of components which could be used to practice the method of the present invention. As described in further detail below, the architecture shown in FIG. 5 demonstrates a system in which the profile database comprises a single locally host a data structure on the profile server, versus FIG. 6 showing a distributed data structure in which the contents of the profile database are stored in multiple network devices and locations, united by a central schema.

Referring first to FIG. 5, there is shown an architecture which includes a profile server 2, hosting a profile database 4 which in this case consists of a plurality of profile records 4 and a plurality of subscription records 5. The precise design of the data structure used to maintain the necessary profile and subscription records to exercise the method of the present invention will be understood to be capable of execution in many different formats and any type of data structure which can be managed by the intermediation software application 6 of the present invention and the remainder of the method outlined herein is contemplated within the scope of the present invention.

Each profile record corresponds to the information of a subject entity, and stores at least one subject information element being a database field associated with that subject entity. Each subscription record represents an approved connection between a subscriber, and their subscriber device or devices, and at least one subject information element of a profile record.

The profile server 2 is shown connected to a network 7 by a network connection 8. Entity devices 9, requester devices 10, and subscriber devices 11 would all interact with the profile server 2 in the intermediation of subject information elements and information of entities stored within a profile database. The profile server 2 might include various software applications to manage aspects of interaction between various components of the system 1. The profile server 2 would include an intermediation software application 6, responsible for the administration and handling of the method of the present invention.

The profile database 4 could comprise a single data file or multiple data files located or hosted on the server 2, or in some embodiments as are demonstrated in further detail below with respect to FIG. 6 certain elements of the profile database 4 might be posted on additional network devices, either locally or remotely.

The wide area network 12 to which the server 2 and other devices of the architecture of the system 1 are connected would likely comprise the Internet. The network 12 could be any type of a communications network capable of communication between devices 9, 10, 11, and the profile server 2. The network 12 as shown can also be a combination of multiple networks each of which are of similar or different topologies, such as cable networks, local area networks, personal area networks, wide area networks, the Internet, wireless communications networks, ad hoc networks, mesh networks and the like.

For demonstrative purposes, the architecture shown in FIG. 5 shows the profile server 2 along with a subject entity device 9—being a smart phone or tablet computer, a requester device 10, shown as a laptop computer, and a subscriber device 11 which is shown in this Figure as a server although it will be understood that any of these three categories of entity devices could comprise different devices which were all capable of communication with the profile server 2 and the intermediation software application 6 in accordance with the remainder of the present invention. The number and type of each of these devices, namely entity devices, requester devices, and subscriber devices, could all vary.

FIG. 6 shows an alternate sample system architecture of the present invention, intended to demonstrate the potential for a distributed or unstructured profile database. The general concept of unstructured profile database 4 is that the central database schema or processor instructions required for access along with potentially a portion of the profile data for the database 4 is stored in the profile server 2, with additional portions of the profile data 13 shown stored on multiple additional network devices in operative connection to the profile server 2. Specifically shown in this Figure, there are profile data 13 subsets shown on three remote network devices, connected to the network 7 by which they can communicate with the server 2 and other devices on the network. The devices hosting these remote sections of profile data 13 are shown as to separate remote servers 12, as well as showing a portion of the profile data 13 being resident on a subscriber device 11 which might also be a server or some other type of a device. The system as outlined in this Figure is just one basic embodiment of a distributed data architecture which is intended to demonstrate the widespread application and configuration of the system of the present invention in accordance with the remainder of the subject matter outlined herein.

Figure 7:
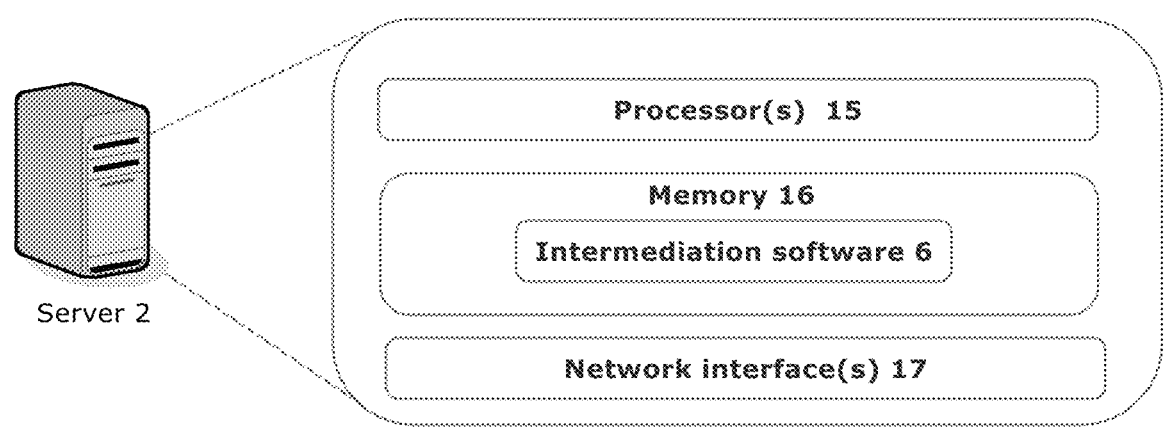
FIG. 7 is a block diagram of the components of a profile server in accordance with one embodiment of the present invention.

Profile Server:

A profile server 2 in accordance with the present invention, as shown in FIGS. 5 and 6, as shown in schematic detail in FIG. 7. The profile server 2 would comprise at least one processor 15 and memory 14—the memory 14 might contain various software applications or a series of processor instructions for use in the operation of the server 2 or otherwise for execution of the method of the present invention. Processor instructions corresponding to the intermediation software application 6 are shown stored within the memory 16.

Also shown is at least one network interface 17, which the server would use in conjunction with other hardware and software thereon to communicate via the network 7 with other network devices within the architecture and method of the present invention.

The memory 16 might directly contain the the profile database 4, or the storage device containing the profile database 4 or other data required for execution of the method of the present invention might reside on a connected storage device capable of communication with the remainder of the server 2 for execution of the method outlined herein. Such a storage device might be a disk drive, onboard memory, network storage device or otherwise—any type of a resident or connected data store for the residents of the profile database 4 will be understood to those skilled in the art of system architecture and software design and any such approaches are contemplated within the scope of the present invention. The profile database 3 as outlined elsewhere herein would at its core comprise a plurality of profile records 4 as well as a plurality of subscription records 5 which could be used by the intermediation software application 6 and the remainder of the system of the present invention to administer the method.

In many embodiments of the method of the present invention, profile server 2 is contemplated to be a Web profile server or a web enabled profile server, where devices including entity devices, requester devices and subscriber devices could use a web browser or similar software to interact with the profile server 2. In other cases, in which entity devices, requester devices are subscriber devices communicate with their users and with the profile server 2 with other local client software rather than through a web interface, the profile server 2 or another server operatively connected thereto and in operation or with may not be a Web server. As outlined elsewhere herein, the profile server 2 per se may also comprise multiple servers connected and working together, posting different portions of the processor instructions and data required for the practice of the method of the present invention. It may also be the case that dependent upon the specifics of the embodiments of the system of the present invention finally developed that in addition to the core method outlined herein, additional servers 2 or other storage or hardware and software components may be required to provide added functionality to the delivered embodiment of the method of the present invention and again all such approaches are intended to be covered by the scope of the subject matter outlined herein. It will be understood by those skilled in the art of such developments to be capable of practice on any type of a server 2 which is capable of communication with remote network devices used by requesters, subject entities or subscribers.

The profile server 2 would host or be operatively connected to the data store 3 which contains the profile database 4 and the subscription database 5—along with the subscriber database 6 as shown. In addition to the necessary general operating system instructions and the like, the profile server 2 would also comprise an intermediation software application 6 which would be responsible for execution of the method of the present invention of the profile server and would coordinate communication with entity devices 9, requester devices 10 and subscriber devices 11 seeking to participate in the method of the present invention to access or provide updates to intermediate content stored within the profile database 4.

The intermediation software application 6 would comprise numerous subroutines for executing the method including administering the databases 4 through 6, creating and modifying transactions and records in the data store 3 in the process of interaction with entity devices, requester devices are subscriber devices, as well as additional financial or numerical transactions, searches, or reporting as might be required. The details of the operation of the intermediation software application 6 are outlined elsewhere herein.

Figure 8:
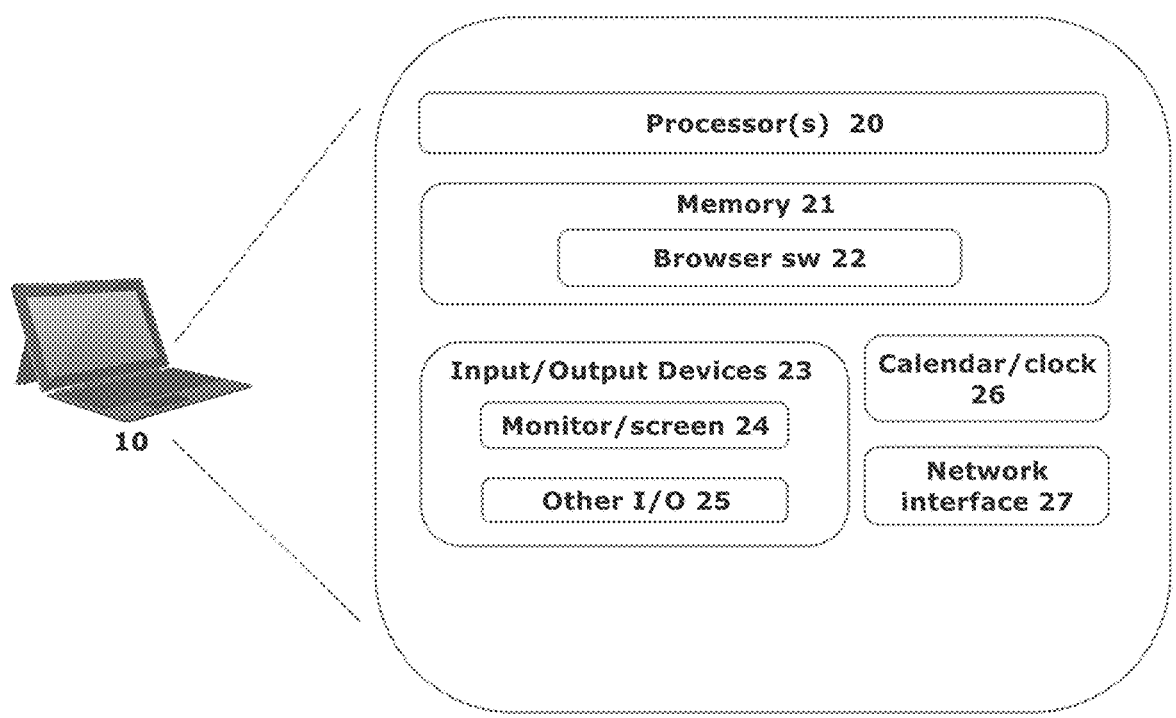
FIG. 8 is a block diagram of the components of a subject entity device in accordance with one embodiment of the present invention.

Requester Devices:

The method of the present invention explicitly contemplates the use of network connected requester devices 10 by requesters seeking to initiate subscription or update transactions with the profile database in accordance with the present invention. Any type of a network connected device including a computer, tablet, smart device or other type of a computing device which was capable of communication with the profile server 2 by the network 7 and its related network interface is contemplated within the scope of the present invention. FIG. 8 is a schematic block diagram of one such requester device 10 which could be used—a portable tablet is shown.

The requester device 10 which is shown includes one or more processors 20 in a memory 21. The memory of the user device 10 might include various types of processor instructions either for assistance in the execution of the method of the present invention or for other activities to be undertaken using that requester device 10. The memory 21 would include the necessary software 22, shown as a browser in this case, to facilitate the submission of subscription or update requests to the profile server by a requester using the requester device 10, in accordance with the remainder of the method of the system of the present invention.

The requester device 10 includes a network interface 27 by which the requester device 10 can communicate via the data network 7 with the profile server 2. The requester device 10 shown in this Figure also includes a clock 26 as well as a plurality of input and output devices 23—a user display 24 and other input output devices 25 are shown. Some requester devices 10 such as this one which is shown might also include a keyboard or other similar input devices. Most commercially available network hardware devices include all the necessary hardware and software components to participate in the method of the present invention, so long as they have some means of user interaction and a network connection which can be used to connect with the profile server 2 in accordance with the remainder of the method of the present invention.

As outlined elsewhere herein, a requester operating the requester device 10 to initiate a subscription request or an update request might be a subject entity, subscriber, or a third party. A requester device 10 might be used as a subject entity device 9 where the user either already is or becomes a subject entity or a subscriber within the terminology of the remainder of the present invention.

As outlined elsewhere herein, the software 22 contained within the memory 21 of the requester device 10 would be client software facilitating communication with the intermediation software application 6 resident on the profile server 2. Where the profile server to provide a web interface, the client software contained within the memory 21 might be browser software 22. In other cases, substantive or specific local client software 22 facilitating interaction with the profile server 2 over the Internet or via some other wide area network communications protocol are all contemplated within the scope of the present invention. In certain embodiments of the requester device 10 and related software installed thereon, client software 22 installed within the memory 21 of the client device might also be programmed to conduct portions of the method of the present invention on behalf of or in direct conjunction with other components of the intermediation software application 6. Again all such modifications which result in the achievement of the method of the present invention as otherwise outlined herein will be understood to those skilled in the art of client/server software design and are all contemplated within the scope of the present invention.

Figure 9:
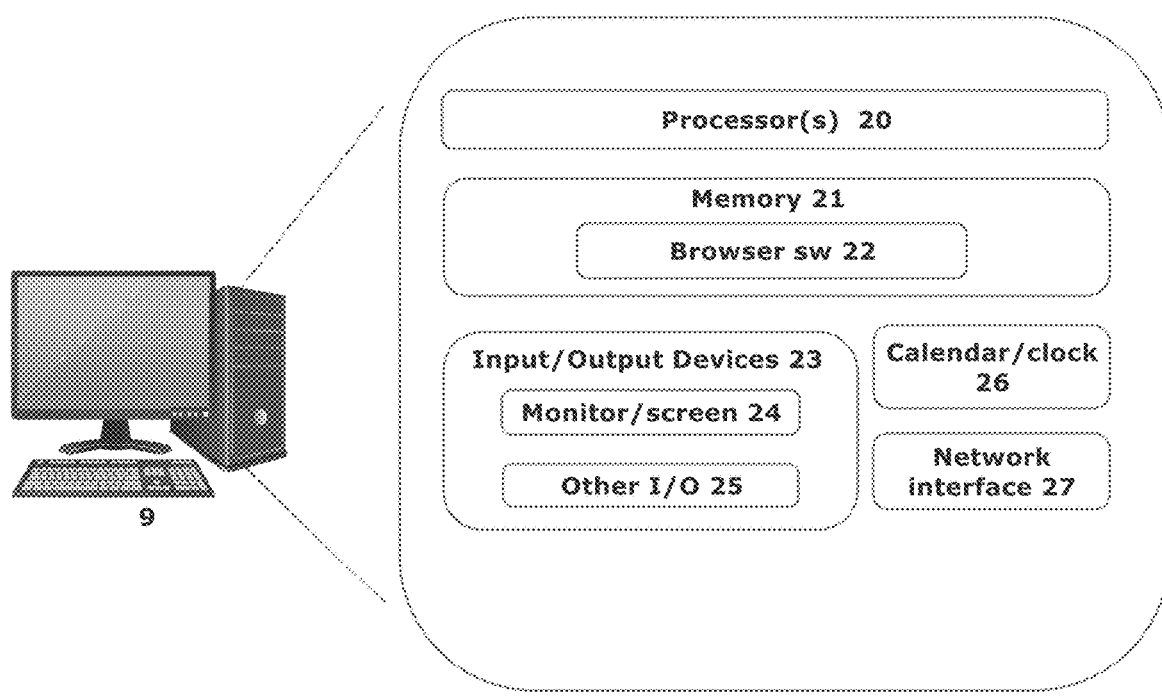
FIG. 9 is a block diagram of the components of a subscriber device in accordance with one embodiment of the present invention.

Subject Entity Devices:

In addition to the requester devices 10 which are outlined above, it is also specifically contemplated that subject entities participating in the method of the present invention in terms of the approval of various request for subscription access or the posting of updates to profile records within the profile database 2 of which they are subject, would use subject entity devices 9 to participate. Like the requester devices 10 outlined above, subject entity devices 9 would be any type of a network device capable of operation by a subject entity in communication with the intermediation software application 6 resident on the server 2. FIG. 9 shows a schematic component diagram of a subject entity device 9 which again consists of typical computing device components including a processor, memory and the like. The same category of components are shown with respect to the requester device 10 demonstrated in FIG. 8 are shown. The subject entity device 9 which is shown is a desktop computer although as will be understood with respect to other client devices in the network system of the present invention and several different types of devices could be used. The software 22 shown would be either a browser or a local client software package which could assist the subject entity operating the subject entity device 9 in the participation the method of the present invention—specifically in entering or maintaining contents of their profile record in the profile database 2 directly, in communication with the intermediation software application 6, or to allow for presentation and interaction with subscription requests and update requests in accordance with the remainder of the present invention. Any type of a network device which can perform the subject entity components of the method of the present invention in communication with the software and data resident on or connected to the profile server 2 in accordance with the remainder of the present invention are contemplated within the scope hereof.

Figure 10:
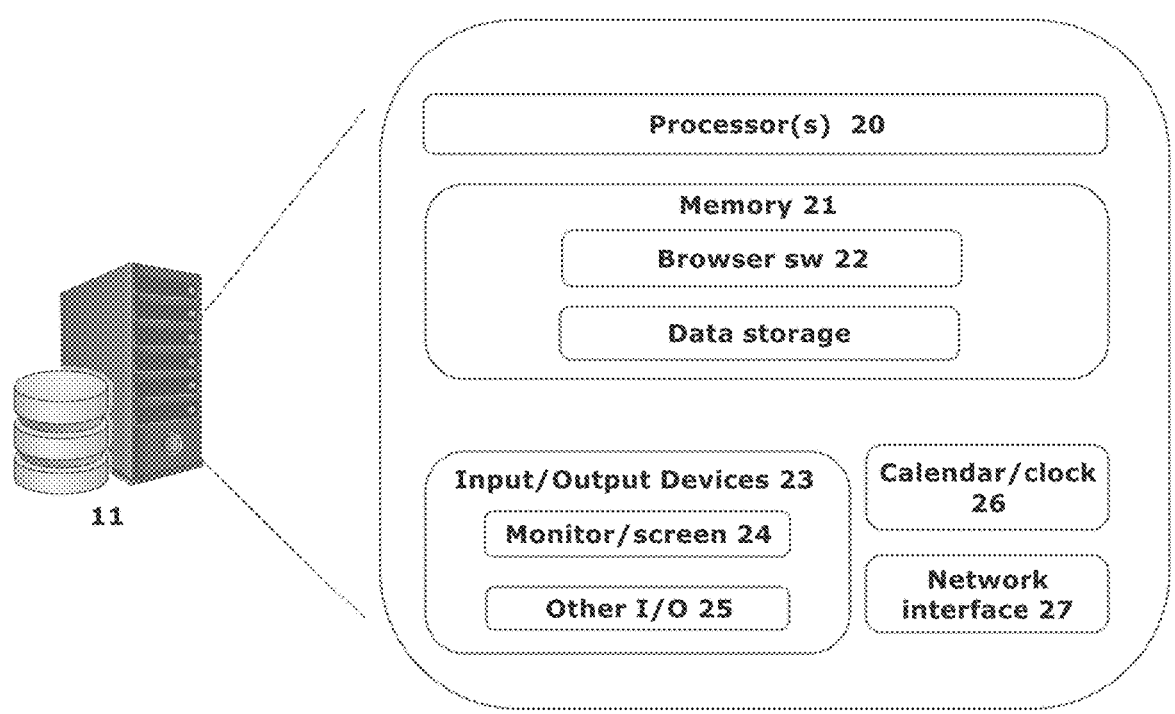
FIG. 10 is a block diagram of the components of a requester device in accordance with one embodiment of the present invention.

Subscriber Devices:

Also shown schematically and demonstratively in FIG. 10 is a sample schematic of a subscriber device 11 in accordance with the method of the present invention. The subscriber device 11 which is shown is a server, which would have the necessary interface components to allow an operator being the subscriber or a subscriber's nominee to interact with the software and the method of the present invention, although particularly in the case of a distributed profile database 2 such as is demonstrated in the system embodiment of FIG. 6, or in other cases where the subscriber device 11 was a business system and server of the subscriber being a vendor in a subscription relationship of certain subject information elements of at least one subject entity in accordance with the remainder of the method of the present invention, the presentation of the subscriber device 11 is a server for the sake of understanding of the complete scope of the method of the present invention will be understood. It will however also be understood that the subscriber device 11 could also be another individual computing device of any type which was capable of network communication by the network 7 with the server 2—tablets, personal computers, smart devices or otherwise—any type of a device again will be understood to be within the scope of the present invention.

The elements in the schematic of the subscriber device 11 shown in FIG. 10 are numbered and presented like those of the requester device 10 of the subject entity device of online outlined above, as the core hardware and software components of any type of a network capable computing device will be understood to be similar Data storage for local computer systems or for databases which might be field mapped against the contents of the profile record of a subject entity stored within the profile database operatively connected to the server 2 is also shown. The data storage shown in this embodiment might be storage containing business systems of the subscriber, which it was desired to keep in sync with the profile database 3 and its contents, and in other cases components of the data storage in the subscriber device or subscribers server 11 might also be connected back to the central server 2 for the purpose of acting as a subject portion of the overall profile database 3 where the database 3 was an unstructured dataset as outlined elsewhere herein. Again, all such approaches are contemplated within the scope of the present invention and will be understood to those skilled in the art of client/server software design. Also, again the software 22 shown residents on the server might comprise a browser or in the case of the subscriber device 11 comprising server it might also comprise in the place of a browser, server type software 22 for unattended operation in conjunction with the remainder of the components of the system and the method of the present invention.

Communications Network:

As outlined throughout, it is specifically contemplated that the communications network 7 which would be used for communication between the profile server 2, and the various devices 9, 10, 11, would be the Internet or another publicly available wide area network. Specific communications protocols for communication between the devices and the server can vary, and different communications protocols which can be used in this type of an architecture will be understood to those skilled in the art of wide area computer network design and all such approaches are contemplated within the scope of the present invention.

Profile Database:

In the sample architecture diagram shown in FIGS. 5 and 6, there is shown a profile database or data stored 3 operatively connected to the remainder of the profile server 2 which contains the various datasets required for the operation of the method of the present invention. Specifically, the profile database 3 as shown contains or hosts a plurality of profile records 4 and a plurality of subscription records 5, the configuration and content of which are each outlined in further detail elsewhere herein. Each of these datasets of records could comprise a subset of a consolidated profile database 3 such as is shown here, or might in other embodiments be represented by individual databases or data stores, or unstructured dataset stored separately within the memory or storage of the server 2 or operatively connected by the network 7 thereto. Any such approach will be understood to be within the scope of the present invention. Any type of a data structure capable of storing the various information for these data subsets in respect of subject entities, entity information, and subscriptions and updates to that information which are completed in accordance with the method of herein, are contemplated within the scope of the present invention.

The construction or data structure of the profile database 3 or individual datasets related thereto might also depend on other aspects of the infrastructure design of the remainder of the system of the present invention. Again, various aspects of the system and the database structure including those which are infrastructure dependent will be understood to those skilled in the art of relational or unstructured database and client/server system design and are all contemplated within the scope of the present invention.

Figure 11:
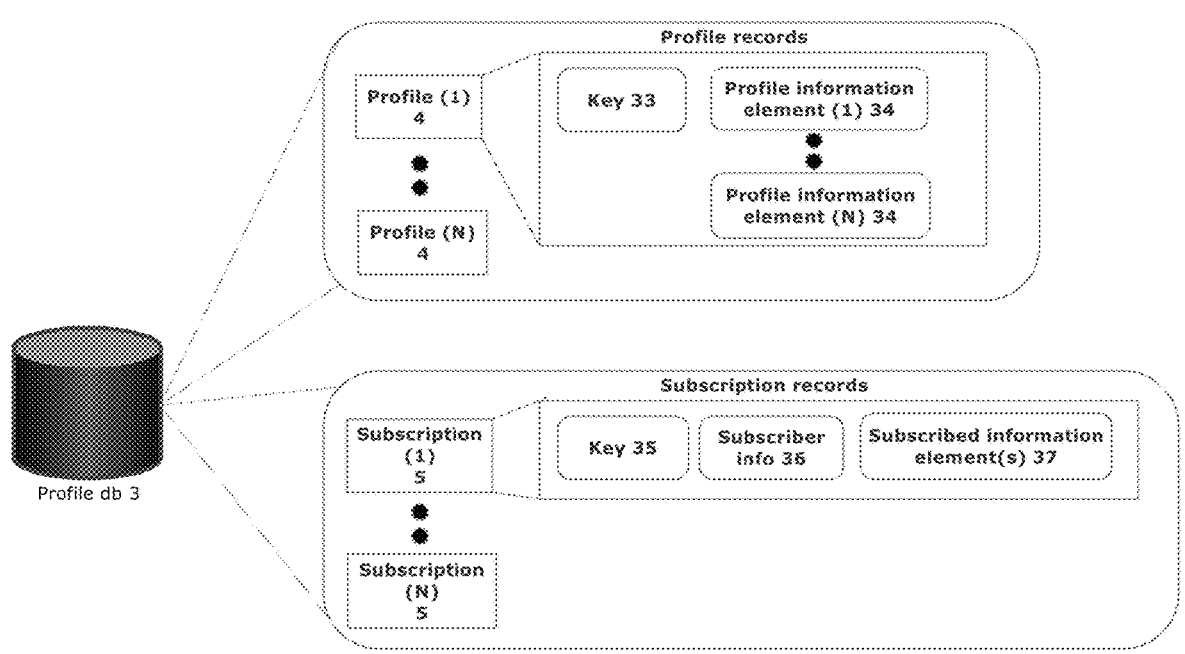
FIG. 11 is a block diagram of one embodiment of a data store and the relevant datasets in accordance with the present invention.

FIG. 11 shows one embodiment of a profile database 3 in accordance with the present invention, to demonstrate the basic concepts of an anticipated data structure. The profile database 3 consists of a plurality of profile records 4 each of which pertains to a subject entity, being an entity or individual as outlined elsewhere herein. The profile record contains at least one subject information element in respect of the subject entity—specifically this is a field containing information pertaining to the subject entity. The subject information elements stored within the profile records are at the core of the method of the present invention both in terms of providing subscriber access to the subject information elements in certain profile records pertaining to subject entities, as well as in terms of the intermediated update system outlined in the remainder of the method herein. The number of profile records 4 within the database 3 can vary, as is shown FIG. 11—1 through N profile records 4 are shown, each of which corresponds to the subject entity information of a subject entity.

The details of the structure and content of each profile record 4 could vary depending upon the deployment of the particulars of the system and method of the present invention, but in general each profile record 4 would likely include a subject entity identifier or a similar database key 33 which could be used for identifying the particular subject entity and profile record 4 in the operation of the remainder of the software and method of the present invention as well as to link the profile record 4 to other records and other datasets in the system.

In addition to any database key 33, profile records 4 would also include at least one profile information element field 34 in respect of the subject entity who is the subject of the information contained within the profile record 4 in question. Subject information elements 34 stored within a profile record 4 could be virtually any information that was desired to retain for record-keeping or method purposes in respect of the subject entity on whose behalf the profile record 4 had been established. The subject information elements 34 might explicitly include commercial business details which could be used to facilitate various types of commercial transactions between subject entities and business parties or vendors.

Profile records 4 might also include additional information beyond the subject information elements 34, either comprising additional necessary files or data processor instructions to enable the intermediation software application 6 to perform the method, or in other cases as outlined might comprise any number of additional types of information or content which may be desired to be stored in respect of the profile record 4 for use in or alongside the administration of the remainder of the method outlined herein.

The profile records and their structure within the profile database 3 could take many forms. Any type of a data structure which would permit the maintenance of subject information elements 34 in respect of one or more subject entities in a plurality of profile records 4 will all be understood to be within the scope of the present invention. Also as outlined elsewhere herein, certain embodiments of the system and method of the present invention in vision the ability for users of the system or the method to customize the contents of a profile record 4 either at the time of creation and configuration of that record 4 or in response to an update request submitted from a requester device. Data structures, either of relational or unstructured nature, which would accommodate the addition of such customized or template subject information element fields 34 to a record or records 4 within the database 3 will also will be understood to be within the scope of the present invention.

In some embodiments of the system of the present invention, each profile record 4 within the profile database could contain the same framework and subject information elements. In other embodiments, individual profile records 4 might contain different numbers or types of subject information element fields. Both such approaches are contemplated within the scope of the present invention. It is also explicitly contemplated that profile update requests transmitted to the server 2 in some cases where the intermediation software application 6 will permit, could request the addition of more subject information element fields 34 to a profile record or records 4 within the database. Modification to the structure or to the contents of a profile record 4 could be requested in a profile update request.

In addition to the flexibility to permit the same or different numbers of subject information elements to be tracked in each profile record 4, certain embodiments of the system and method of the present invention may allow for the creation of custom formatted subject information element fields within one or more profile records 4 in the database 3. In further embodiments where it was possible to allow for the addition of subject information elements to one or more profile records for following their initiation, the system could permit the addition of templates outlining the particulars or formats of particular subject information elements.

The second dataset contained within the profile database 3 or in a freestanding data structure accessible to the profile server 2 and the intermediation software component six is a plurality of subscription records 5. The subscription record subset contains a plurality of subscription records 5 each of which represents a validated subscription connection between a subscriber and at least one subscribed information element 34 of a subject entity stored in the profile records 4 in the database 3. Again, the number of subscription records 5 in the dataset as contemplated herein would likely correspond to the number of active subscriptions in accordance with the method and system of the present invention but the specific structure of the maintenance of subscription record information could be conducted as outlined herein or in a subdivided data structure and again all such approaches are contemplated within the scope of the present invention. As shown in FIG. 11, subscription record 5 would likely include a database key of some type 35, along with potential identifying information 36 pertaining to the subscriber in question. Additionally, the subscription record 5 would contain an indicator and/or restricting parameters if imposed on access by the subscriber who is the subject of the subscription record to specific profile information elements 34 of a particular profile record 4 within the database. The subscribed information element information is shown at 37 in this Figure.

It will be understood to those skilled in the art of web application design and database structure and programming that any number of different approaches could be taken to the construction, structure and population of the profile database 3 and the method outlined above or any number of different embodiments as will be obvious to those skilled in the art here from are all intended to be within the scope of the present invention and do not depart from its intended purpose.

Intermediation Software Component:

The functions of the intermediation software application 6 would include the creation and administration of profile records 4 and subscription records and will five within the profile database three as well as interaction with requesters, subscribers and subject entities by other devices in various sessions conducted in communication between those devices and the profile server two. Each function or module of the intermediation software application 6 could be a freestanding software application or subroutine within a memory or storage on the server 2, or alternatively they can all be functions of a consolidated software program—and any approach is contemplated within the scope hereof.

Figure 12:
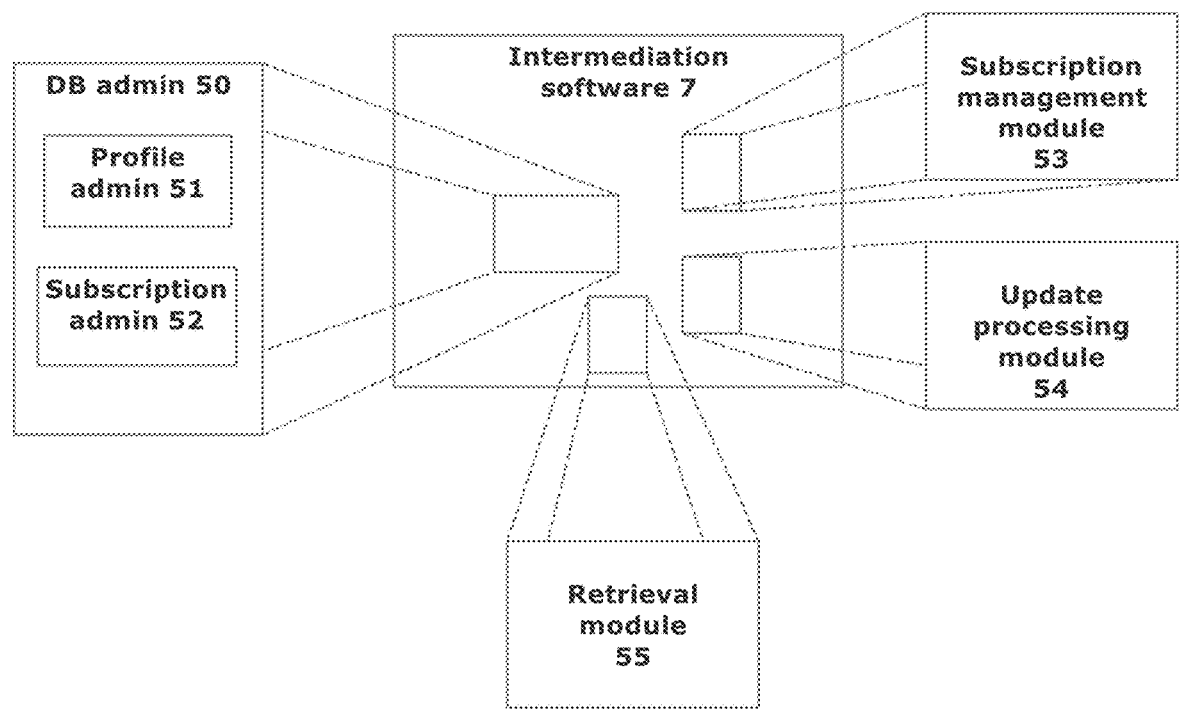
FIG. 12 is a block diagram of one embodiment of the intermediation software application of the present invention, showing the different software subroutines therein.

Referring to FIG. 12 there is shown a block diagram demonstrating one embodiment of the subroutines or functions that might be contained within a typical embodiment of an intermediation software application 6 in accordance with the present invention. There is first shown the database administration module 50 which could have a number of subroutines are sub functions therein for the administration of profile records, subscription records etc.—these record administration subroutines are shown in this Figure as elements 51 and 52. Each of the database administration subroutines 51, 52 might also be called upon by other components of the intermediation software application 6 and the querying, extraction or reporting upon the contents of their respective datasets.

In addition to the overall database administration module 50 and its related subroutines, the processor instructions accessible to the server 2 and comprising the intermediation software application 6 would also include the necessary software instructions to facilitate communication of the profile server 2 with devices via the network 7 and the network connection of the server 2.

Also shown in the software embodiment of FIG. 12 is a subscription management module 53 which would contemplate comprising the necessary processor instructions for use by the profile server 2 to communicate with requester devices 10 within the context of subscription requests sessions i.e. initiating sessions, seeking approval or rejection of those requests by the subject entities in question and creating the necessary resulting records etc. The subscription management module 53 might include numerous subroutines for the conduct of different system transactions related to the expiration of subscription requests and request sessions between requesters and subject entities using devices.

Also and similarly shown is an update processing module 54 which may or may not be a freestanding subroutine within the intermediation software can—the update processing module 54 would be responsible for accomplishing the related system transactions and reporting etc. which were required to initiate and conduct a profile record update request approval session—the administration of update transactions as otherwise outlined herein would be responsible of such a software module 54. It will be understood that the necessary software to facilitate the processing of update requests and profile record update transactions in accordance with the remainder of the method of the present invention is an important function of the intermediation software application 6 and any approach to the overall method of the present invention which results in the ability of the system, the method of the software operable on the profile server to provide this transaction processing is contemplated within the scope of the present invention.

Figure 2:
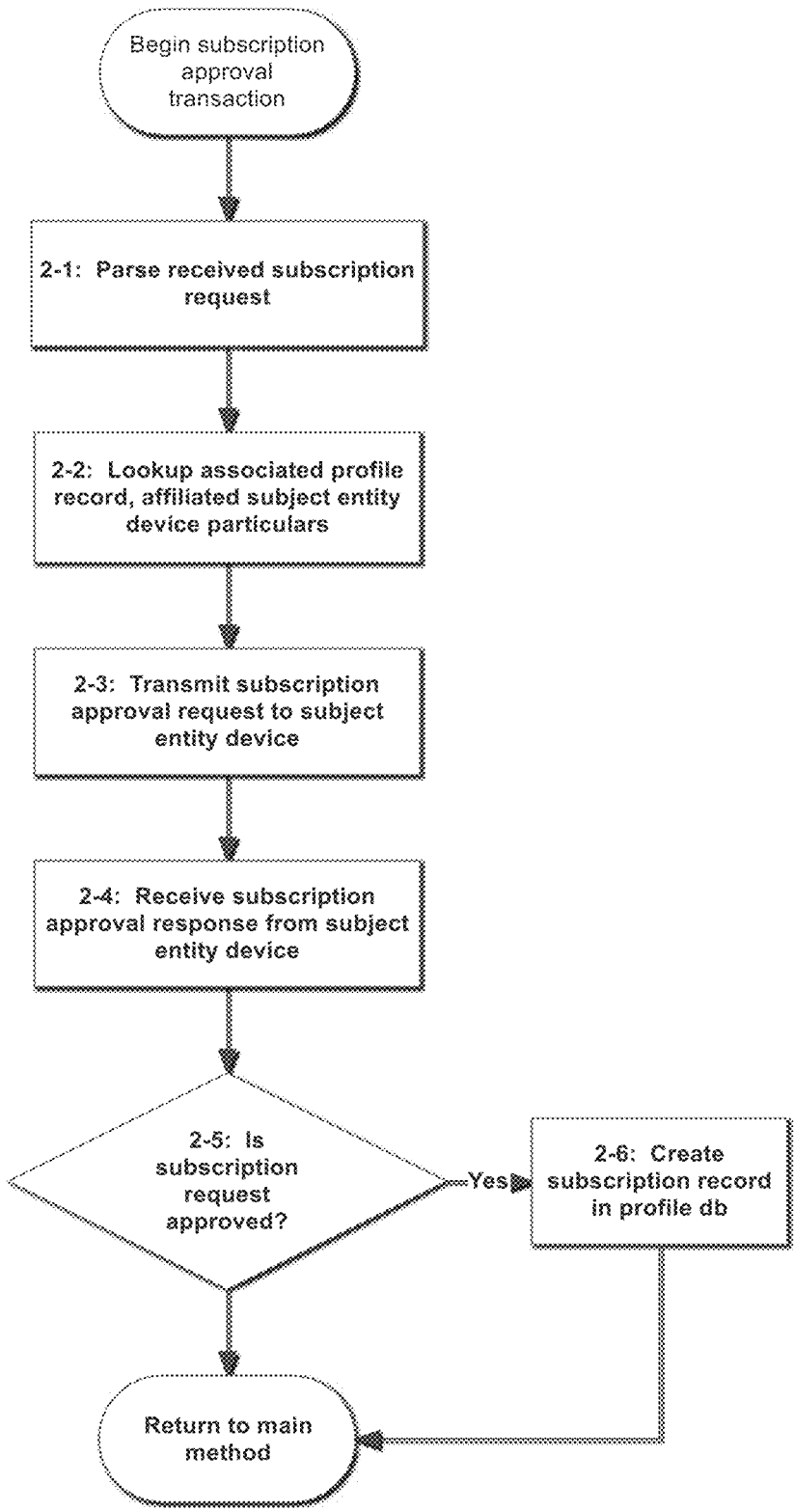
FIG. 2 is a flowchart showing the steps involved in one embodiment of the method of a subscription transaction outlined in FIG. 1.

Subscription Transactions:

While the overall method of the present invention will be understood from the remainder of this document we now will provide some further detail around the conduct of different types of data transactions in accordance with the method of the present invention. Referring first to FIG. 2 there is shown a flowchart demonstrating the steps in one sample of a subscription approval transaction in accordance with the present invention. A subscription approval transaction would be a data handling transaction initiated by the intermediation software application 6 upon the receipt by the profile server and the intermediation software component will six of a subscription request from a requester device. A subscription request is a request on behalf of an entity seeking to be a subscriber to at least one subject information element of a profile record, to provide access to same. Upon receipt of a validated subscription request, the intermediation software application 6 would initiate a subscription approval transaction by first conducting any necessary parsing of the subscription request, shown at step 2-1, and looking up associated information from the corresponding profile record including identifying the subject entity device of the subject entity associated with the related profile record for the purpose of dispatching a request for approval of subscription request. Look up of the particulars of the associated subject entity device is shown at 2-2.

Following the conduct of identification of the subject entity device of the subject entity associated with the related profile record, the intermediation software application would in the next step 2-3 transmit a subscription approval request including the details of the subscription request to that subject entity device. The subscription approval request as transmitted could consist of many different types of user facing information or prompting—everything from the dispatch of an SMS text link requiring approval through to a browser or other client software notification indicating that a subscription approval request has been provided for addressing by the subject entity in question. As outlined in further detail throughout this document, any number of different types of actual client/server interaction between the subject entity in the profile server via the user interface of the subject entity device can be contemplated and are all understood within the scope of the present invention. The transmission of the subscription approval request from the server to the subject entity device would result in the display of the subscription approval request and provision of opportunity for approval or rejection of that request by the subject entity at the subject entity device in question.

The subject entity from their subject entity device would address the subscription approval request by provision of a subscription request response back to the server which either approve or refuse the subscription request. Effectively, it is contemplated that the user interface of the subject entity device would provide a streamlined method by which the subject entity can either approve or refuse the request on behalf of the particular third-party for subscription access to subject information elements in their profile record. Once the user of the subject entity device on behalf of the subject entity approve or refuse the subscription request in response to the subscription approval request dispatched thereto by the server, a subscription request response would be transmitted from the subject entity device back to the profile server where it would be received. Receipt of a subscription approval response is shown at 2-4.

Once the subscription approval response is received by the profile server 2 over the network 7 via the network interface of the server 2 etc., if the subscription request is approved, a subscription record is created—shown at 2-5 and 2-6. If the subscription request were refused, the main monitoring method and listing loop would continue. It will be understood that with a scaled solution, the server 2 would be capable of monitoring and processing many subscription requests and subscription approval transactions of the same time.

In business terms a subscription request might be received from a subscriber who was a vendor, wanting to gain access to ongoing updates of the up-to-date address information or other similar information pertaining to a particular subject entity which was their customers. As is outlined in further detail elsewhere herein, the initiator of a subscription request or an update request could be a subject entity themselves, a third-party requester or a subscriber. The subscription request would be initiated by the requester either via a browser interface or other local client interaction from their device with the profile server 2 over the network 7. The most basic iteration of a subscription request or packet which might be transmitted to the profile server 2 by a requester device would identify the subscriber for the purposes of subject entity consideration of the subscription request, and identify the subscriber information elements which it was desired on the part of the particular subscriber candidate to subscribed. This will be the information that would be required for the profile server 2 and the intermediation software application 6 to package a transmission or a prompt in the initiation of a subscription approval transaction to the subject entity device of the subject entity related to the profile record in respect of which the potential subscriber sought access.

The key to the intermediated software method of the present invention is that both in terms of subscription to individual information elements contained within profile records for the system as well as in terms of updates outlined below, the intermediation aspect of the method comprises the constant approval by the subject entity of any access to or update to their profile records. It will be understood that this brief narrative about the subscription approval transactions and the demonstrative workflow shown in FIG. 2 is only illustrative of the general concept of intermediated approval of subscription requests and that any number of different types of method approaches can be taken to the overarching method outlined herein without departing from the intended scope hereof, and all such approaches are contemplated within the scope of the present invention.

A subscription request transmitted from a requester device to the server 2 could seek approval of subscription requests by a particular third-party or on behalf of a particular subscribing third-party to the profile record and subject information elements of more than one subject entity. If a subscription request was received which pertained to more than one profile record by the profile server 2, the intermediation software application 6 could also in parsing that request divide that into multiple subscription requests in respect of each of which a subscription approval transaction could be executed. Approaches to this type of a workflow modification to allow for subscription requests to the subject information elements of more than one subject entity the same time will be understood to those skilled in the art of software design of this nature and are all contemplated within the scope of the present invention.

Any type of local client software, browser modifications or content or the like which could be used to allow for a human approval interface between a network device and the profile server 2 for the purpose of the processing have subscription request and subscription request approval transactions are all contemplated within the scope of the present invention. Many different types of client interactions will be understood to be within the scope of the present invention and all are intended to be encompassed by the claims outlined below.

The subscription request could be initiated by a requester from a requester device 10—the requester could either be a subject entity, a subscriber or another third-party entity. The requester, wishing to establish a subscription to at least one subject information element in profile record for the profile database 3 with a subscriber could be one of many different types of parties and many different technical approaches could be used, as will be understood and outlined herein in the context of the overarching software of the present invention, to initiate the transmission of a subscription request from the requester device 10 to the profile server 2. For example, the requester from the requester device 10 could initiate a subscription request either using a locally installed client software or by dispatching an SMS message, clicking a browser link or otherwise, requesting to commence the subscription process with the server 2, or in other cases it might even be the case that the server 2 or even a third-party network device could prompt a requester at a requester device 10 of elsewhere about whether or not they wish to transmit a subscription request any approach the method of the present invention which allowed for either a requester directly from a requester devices 10 to proactively initiate the transmission and the subscription request, we by a network device providing a call to the requester device 10 which resulted in the origination of a subscription request to the server 2 are all contemplated within the scope of the present invention.

Where a subscription request was initiated by a requester device 10 to the server 2, this would physically comprise the step of initiating a communication between those two devices for the purpose of the transmission of a data packet outlining the details of the subscription request from the requester device 10 to the server 2, and the server 2 would then facilitate the execution of a subscription approval transaction related to that subscription request.

Update Transactions:

The second type of a data processing transaction which is demonstrated in is a core portion of the method of the present invention is an update approval transaction which will also be executed by the various components of the intermediation software application 6 in conjunction with other components of the profile server 2 and in communication with a requester device. A requester could initiate a profile update request from a requester device, by interacting with the profile server 2 via a browser interface or other local client software. The profile update request would be a request from a requester at a requester device 10 to post an update to a profile record 4 within the profile database either by modifying the subject information elements attached to the particular profile record in before in question or by modifying the contents of subject information elements comprising the profile record 4. As in the case of a subscription request, a profile update request could be initiated either manually by a requester via a requester device 10 or could in other embodiments of the initiated automatically based on some type of another event occurring on business systems operatively connected to the network 7.

Figure 3:
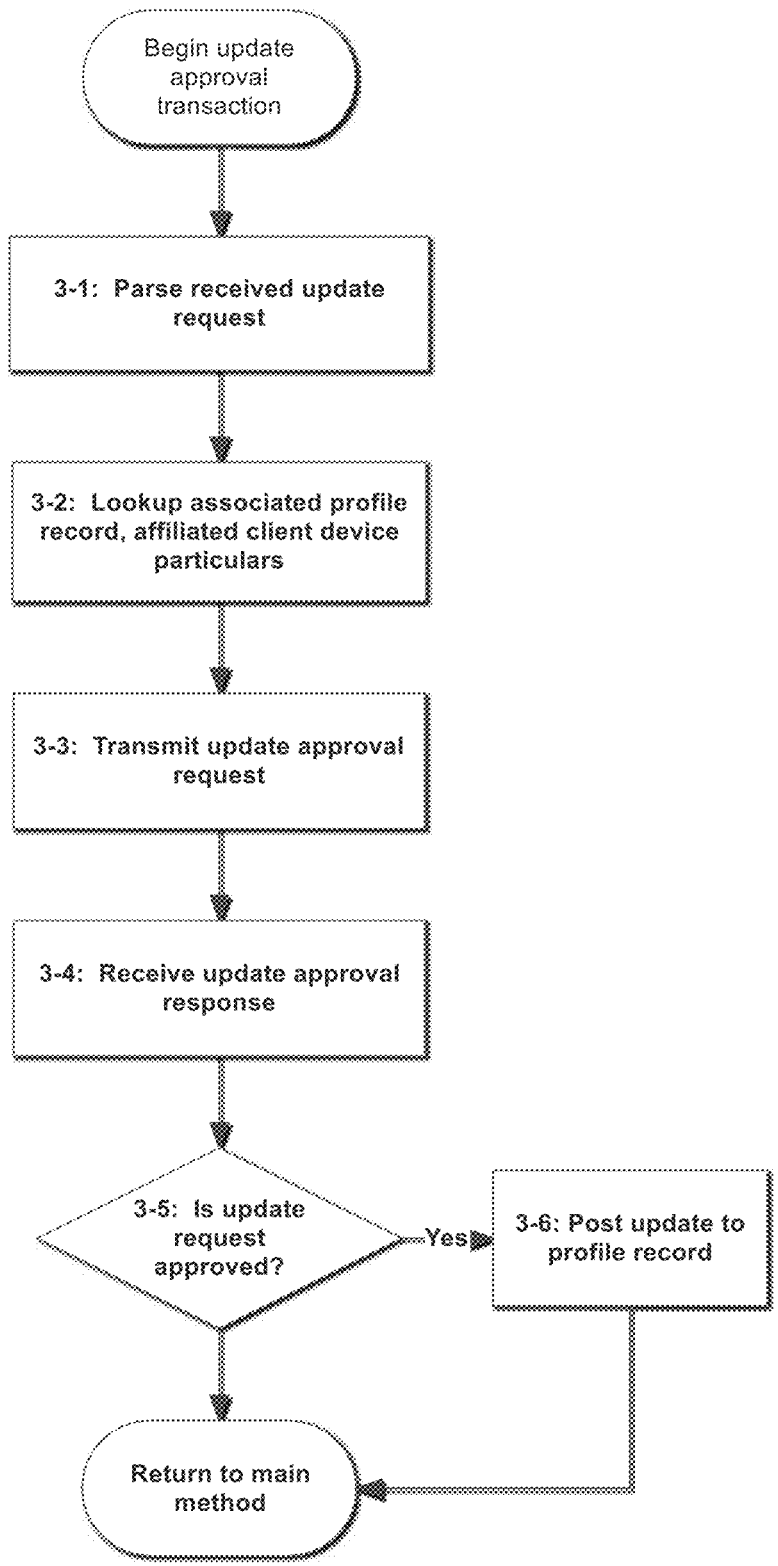
FIG. 3 is a flowchart showing the steps involved in one embodiment of the method of an update transaction outlined in FIG. 1.

FIG. 3 is a flowchart showing the steps in a sample update approval transaction workflow, for demonstration of this aspect of the method of the present invention. As outlined with respect to the subscription approval transaction workflow shown in FIG. 2, if a profile update request was detected by the listening or monitoring loop, at Step 1-3 in FIG. 1, the update approval transaction workflow shown in FIG. 3 could be triggered. The first step of that workflow would be the parsing of the profile update requests received, shown at step 3-1, to extract from the information the necessary particulars to formulate and execute a update approval transaction the information that would be extracted from the profile update request would likely include the details of the profile update requested to be posted, whether that be to add additional subject information element fields or to update the contents of subject information element fields in a particular profile record, as well as identifying the subject entity associated with the profile record in question and their subject entity device for the purpose of transmitting an approval request thereto.

Once the subject entity device to which the update approval request should be transmitted has been identified from the profile record 4 in question, an update approval request would be transmitted to the subject entity device— shown at 3-3. As in the case of the subscription approval transaction outlined with respect to FIG. 2, the update approval request transmission would comprise a notification to the subject entity device of the subject entity in question requiring the issuance of an approval or rejection in respect of the particular profile update request which was furnished by the requester by their requester device 10.

Via the user interface of the subject entity device 9, subject entity could approve or reject the profile update request outlined in the update approval request received thereon. Transmission of a response either approving or rejecting the profile update request in question from the subject entity device 9 to the server 2 would be received at the server—shown at 3-4. When an update approval response is received by the server, it would be assessed for either an approval or rejection of the underlying profile update request. If the profile update request included in that response was a positive approval, the requester profile update can be posted and profile record in question—shown at 3-6. Alternatively, if the update approval response was a rejection, the update would not be posted and the listing loop of the main method would continue.

Any type of local client software, browser modifications or content or the like which could be used to allow for a human approval interface between a network device and the profile server 2 for the purpose of the processing have subscription request and subscription request approval transactions are all contemplated within the scope of the present invention. Many different types of client interactions will be understood to be within the scope of the present invention and all are intended to be encompassed by the claims outlined below.

The initiation of profile update requests in the transmission of the details thereof from a requester device 10 to the server 2 will take place in similar fashion to the initiation and transmission of subscription requests outlined above.

Retrieval Transactions:

The final sub method or subroutine of the overarching method of the present invention, in addition to the receipt and handling of subscription and profile update requests by the server resulting in the issuance of subscriptions to particular information elements stored within the profile database and/or posting of updates to profile records therein, is the monitoring and detection by the profile server 2 of the existence of an information retrieval condition at which time a retrieval transaction can be triggered, extracting the contents of at least one subscribed information element and transmitting it to at least one subscriber device. In addition to allowing for subscriptions to be created to particular subject information elements stored within the profile database, and allowing for the processing of profile record update requests submitted by requesters to requester devices on the network, the system and method of the present invention will provide upon the detection of the existence of a retrieval condition, the contents of subscribed information elements to at least one subscriber device.

Figure 4:
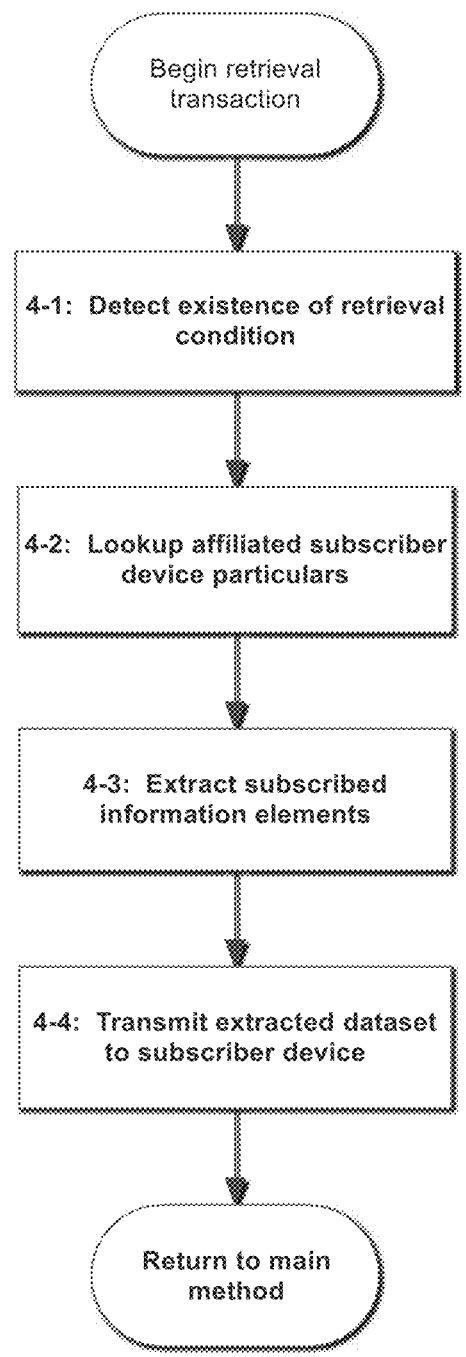
FIG. 4 is a flowchart showing the steps involved in one embodiment of the method of an information retrieval as outlined in FIG. 1.

FIG. 4 demonstrates the steps in one embodiment of the retrieval transaction subroutine in the overarching method of the present invention. The first step in a retrieval transaction is shown as the detection of the existence of a retrieval condition—shown at 4-1. The retrieval condition might consist of the receipt of a request for retrieval of information by the server from a permitted subscriber or subscriber device, or else any number of different types of retrieval conditions could also be conceived where for example the retrieval condition might comprise the arrival of a periodic interval which was programmed at which time the current contents of subscribed information elements would be transmitted to subscriber devices over the network, or even upon the hosting of a profile record update, if the profile record update as posted impacted any subscribed information elements that could be another type of a retrieval condition resulting in the retrieval and transmission of that information. It will be understood that this list of potential retrieval condition is not to be considered exhaustive and there may be many other scenarios or frameworks within which an information retrieval request would be exercised against the profile database 2 on behalf of a subscriber device 11—these would generally speaking fall within the category of manually initiated retrieval conditions, or system or network prompted initiation requests which could be initiated or prompted either by the server 2 or another network device.

Upon the detection of the existence of retrieval condition, the intermediation software application 6 would conduct a lookup or query to confirm or identify the subscriber device 11 into which the information covered by the retrieval condition would be provided. This is shown at step 4-2. Following the identification of confirmation of the subscriber device particulars, the intermediation software application 6 would extracted the desired subscribed information elements from the related profile record 4 of the profile database 3, shown at 4-3—in that extracted dataset would be transmitted to the identified subscriber device, shown at step 4-4.

It will be understood that the general concept of the conditional retrieval of subscribed information element contents and provision of those to one or more subscriber devices 11 of one or more subscribers who are subscribed to those information elements can be executed many ways without departing from the scope of the present invention and all such approaches are contemplated within the scope of the present invention.

Further Enhancements:

Many further enhancements will be understood by those skilled in the art of related system design, which could further enhance or customize the service delivery provided by a system in accordance with the present invention. For example, one significant enhancement which is contemplated to be offered in certain embodiments of the method and software of the present invention would be the maintenance of an audit log or an audit trail, with respect to either update transactions and their approval or rejection and subsequent application to the profile database, as well as even potentially maintaining an audit log of all subscription requests received etc. The level of granularity which is maintained in an audit log can vary depending upon implementation and requirements—any type of an audit trail implementation in accordance with the remainder of the system and method of the present invention will be understood to be within the scope hereof.

Additionally, different types of added business functionality can be built on top of the underlying information infrastructure contemplated herein. Any type of an approach which relies upon a database as outlined herein will be understood to those skilled in the art and again is understood to be contemplated within the scope of the present invention.

In addition to the provision of an audit log, another specific enhancement or embodiment which is contemplated with respect to the present invention is to add a requester database accessible to the server 2, which comprises the preauthorization details of at least one requester—whereby subject entities could create the necessary preauthorization details in the requester database to allow for automatic approval of certain types of subscription requests or profile update requests by a preauthorized requesters without the need for specific intervention by the subject entity to do so.

The system and method of the present invention will be understood to form the basis of many enhanced business processes which could rely upon the intermediated contact information distribution model outlined herein.

In addition to the overall system and method outlined and claimed herein, the present invention is explicitly intended to encompass the intermediation software application 6 itself, as outlined in the various embodiments outlined herein. The intermediated data structure and the profile database 3 are also intended to be encompassed by the claims outlined herein.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of providing intermediated access and updates to centrally maintained information profiles of subject entities via a computer network, said method comprising:
   a) providing a profile server connected to a network, said profile server comprising:
      i. a profile database containing:
         1. a plurality of profile records, each profile record corresponding to a subject entity and containing a plurality of subject information elements with each of the plurality of subject information elements being a field containing information pertaining to the subject entity; and
         2. a plurality of subscription records each corresponding to an approved connection between a subscriber and at least one subject information element of a profile record in the profile database, being subscribed information elements;
      ii. at least one network interface enabling the profile server to communicate with subject entity devices, requester devices and subscriber devices connected to the network; and
      iii. an intermediation software application capable of:
         1. administering the profile database;
         2. processing subscription requests and profile update requests received by the profile server via the network; and
         3. providing the contents of subscribed information elements to subscribers via subscriber devices;
   b) upon receipt by the profile server of a subscription request from a requester device, being a request seeking on behalf of an entity seeking to be a subscriber of at least one subject information element of a profile record, executing a subscription approval transaction by:
      i. identifying a subject entity device of the subject entity associated with the related profile record, said subject entity device having a human interface for operation by a human operator;
      ii. transmitting a subscription approval request including the details of the subject information elements sought to be subscribed and the subscriber seeking access to same to said subject entity device;
      iii. using the subject entity device for:
         displaying the details of the subscriber seeking access and the subject information elements sought to be subscribed via the human interface of the subject entity device to a human operator on behalf of the subject entity;
         permitting the human operator to approve or reject the subscription request via the human interface; and
         transmitting a subscription response back to the server indicating an approval or a rejection of the subscription request in respect of the particular subscriber and subject information elements; and
      iv. receiving the subscription request response from said subject entity device at the profile server and using the intermediation software application to create a subscription record detailing any approved connection between an approved subscriber and subscribed information elements;
   c) upon receipt by the profile server of a profile update request from a requester device, being a request by a requester to post an update to a profile record by modifying the subject information elements attached to said record or their contents, executing an update approval transaction by:
      i. identifying a subject entity device of the subject entity associated with the related profile record, said subject entity device having a human interface for operation by a human operator;
      ii. transmitting an update approval request including the subject information elements sought to be modified and the requester seeking to update same to said subject entity device;
      iii. using the subject entity device for:
         displaying the details of the requester and changes sought to be made to the subject information elements, via the human interface of the subject entity device to a human operator on behalf of the subject entity;
         permitting the human operator to approve or reject the update approval request via the human interface; and
         transmitting an update approval response back to the server indicating an approval or a rejection of the profile update request; and
      iv. receiving the update approval response from said subject entity device, and if the received update approval response approves the profile update request, using the intermediation software application posting the approved modifications to the associated profile record; and
   d) on detection by the profile server of the existence of an information retrieval condition, extracting the contents of at least one subscribed information element and transmitting to at least one subscriber device, wherein no subscription records to particular information elements will be created, and no profile records will be updated, without approval of said subscriptions or changes by a human operator on behalf of the subject entity.

2. The method of claim 1 wherein the profile database comprises a single data structure connected to the profile server.

3. The method of claim 1 wherein the profile database comprises:
   a) a distributed dataset with portions of the database resident on multiple host devices accessible to the profile server via the network; and
   b) a centralized data schema or processor instructions to allow the profile server and the intermediation software application to access and update the distributed dataset.

4. The method of claim 3 wherein at least one host device is a subscriber device or a subject entity device.

5. The method of claim 1 wherein the detection of an information retrieval condition by the profile server comprises one of:
   a) receipt by the profile server of a retrieval request from a subscriber device or a subject entity device of a retrieval request;
   b) determination by the profile server of the existence of a predefined information retrieval condition; or
   c) completion of a profile update request posting an update to a subject information element, resulting in the transmission of any changed subscribed information elements to subscriber devices of subscribers to those changed subscribed information elements.

6. The method of claim 1 wherein a subscription request pertains to a single subject information element.

7. The method of claim 1 wherein a subscription request pertains to more than one subject information element.

8. The method of claim 1 wherein subject information elements can be added to a profile record after its creation.

9. The method of claim 8 wherein subject information elements are added to a profile record pursuant to a profile update request.

10. The method of claim 1 wherein at least one subject information element stored in respect of a particular profile record is selected from a group of template subject information elements accessible to the server.

11. The method of claim 1 wherein the intermediation software application will facilitate the creation of custom subject information elements for storage in respect of a profile record.

12. The method of claim 1 wherein the profile server is a Web server and the network is the Internet.

13. The method of claim 12 wherein the profile server will facilitate interaction with subject entity devices, subscriber devices or requester devices via a web interface.

14. The method of claim 1 further comprising a client software application for use on a subject entity device to facilitate interaction with the profile server including the processing of subscription approval requests and update approval requests.

15. The method of claim 1 wherein a subscriber device is a subscriber server capable of communication with the profile server.

16. The method of claim 1 wherein a subscription record includes a field map between the subscribed information elements and information fields maintained on a subscriber device.

17. The method of claim 1 wherein a requester originating a profile update request is a subject entity, a subscriber or a third party.

18. The method of claim 1 wherein a profile update request contains updates for more than one profile record for approval by the subject entities corresponding to each said profile record.

19. The method of claim 1 wherein the profile server further comprises a requester database containing preauthorization details of requesters, to allow for automatic approval of subscription requests or profile update requests by pre-authorized requesters.

20. The method of claim 1 wherein an audit log is maintained with respect to any changes to any subject information elements and profile records in the profile database.

21. The method of claim 1 wherein the subject information elements vary between profile records.

22. A computing system comprising:
   one or more processors;
   one or more memories; and
   one or more computer-readable hardware storage devices, the one or more computer-readable hardware storage devices containing program code executable by the one or more processors via the one or more memories to provide intermediated access and updates to centrally maintained information profiles of subject entities via a computer network and to cause the one or more computer-readable hardware storage devices of a profile server on a computer network to:
   a) administer a profile database containing:
      i. a plurality of profile records each corresponding to a subject entity, each profile record containing at least one a plurality of subject information elements with each of the plurality of subject information elements being a field containing information pertaining to the subject entity; and
      ii. a plurality of subscription records each corresponding to an approved connection between a subscriber and at least one subject information element of a profile record in the profile database, being subscribed information elements;
   b) communicate with subject entity devices, requester devices and subscriber devices connected to the network via at least one network interface of the profile server;
   c) upon receipt by the profile server of a subscription request from a requester device, being a request seeking on behalf of an entity seeking to be a subscriber of at least one subject information element of a profile record, executing a subscription approval transaction by:
      i. identifying a subject entity device of the subject entity associated with the related profile record, said subject entity device having a human interface for operation by a human operator;
      ii. transmitting a subscription approval request including the details of the subject information elements sought to be subscribed and the subscriber seeking access to same to said subject entity device;
      iii. facilitating the display of the details of the subscriber seeking access and the subject information elements sought to be subscribed via the human interface of the subject entity device to a human operator on behalf of the subject entity and permitting the human operator to approve or reject the subscription request via the human interface;

iv. receiving a subscription request response back from the subject entity device indicating the approval or rejection of the subscription request in respect of the particular subscriber and subject information elements, following the approval or rejection of same by the human operator at the human interface of the subject entity device; and v. if the received subscription request response approves the subscription request, creating a subscription record detailing any approved connection between the approved subscriber and subscribed information elements; and d) upon receipt by the profile server of a profile update request from a requester device, being a request by a requester to post an update to a profile record by modifying the subject information elements attached to said record or their contents, executing an update approval transaction by:

i. identifying a subject entity device of the subject entity associated with the related profile record, said subject entity device having a human interface for operation by a human operator;

ii. transmitting an update approval request including the details of the subject information elements sought to be modified and the requester seeking to update same to said subject entity device;

iii. facilitating the display of the details of the requester and changes sought to be made to the subject information elements via the human interface of the subject entity device to a human operator on behalf of the subject entity and permitting the human operator to approve or reject the update request via the human interface;

iv. receiving an update approval response indicating an approval or rejection of the profile update request based upon the interaction of the human operator with the subject entity device; and v. if the received update approval response approves the profile update request, posting the modifications requested in the profile update request to the associated profile record; and e) on detection by the profile server of the existence of an information retrieval condition, extracting the contents of at least one subscribed information element and transmitting to at least one subscriber device, wherein no subscription records to particular information elements will be created, and no profile records will be updated, without approval of said subscriptions or changes by a human operator on behalf of the subject entity.

23. The computing system of claim 22 wherein the profile database comprises a single data structure connected to the profile server.

24. The computing system of claim 22 wherein the profile database comprises:
a) a distributed dataset with portions of the database resident on multiple host devices accessible to the profile server via the network; and
b) a centralized data schema to allow the profile server and the program code to access and update the distributed dataset.

25. The computing system of claim 22 wherein the detection of an information retrieval condition comprises one of:
a) receipt by the profile server of a retrieval request from a subscriber device or a subject entity device of a retrieval request;

b) determination by the profile server of the existence of a predefined information retrieval condition; or
c) completion of a profile update request posting an update to a subject information element, resulting in the transmission of any changed subscribed information elements to subscriber devices of subscribers to those changed subscribed information elements.

26. The computing system of claim 22, wherein a subscription request pertains to a single subject information element.

27. The computing system of claim 22 wherein a subscription request pertains to more than one subject information element.

28. The computing system of claim 22 wherein subject information elements can be added to a profile record after its creation.

29. The computing system of claim 22 wherein subject information elements are added to a profile record pursuant to a profile update request.

30. The computing system of claim 22 wherein at least one subject information element stored in respect of a particular profile record is selected from a group of template subject information elements accessible to the server.

31. The computing system of claim 22 wherein the program code facilitates the creation of custom subject information elements for storage in respect of a profile record.

32. The computing system of claim 22 wherein a subscription record includes a field map between the subscribed information elements and information fields maintained on a subscriber device.

33. The computing system of claim 22 wherein a requester originating a profile update request is a subject entity, a subscriber or a third party.

34. The computing system of claim 22 wherein a profile update request contains updates for more than one profile record for approval by the subject entities corresponding to each said profile record.

35. The computing system of claim 22 wherein the profile server further comprises a requester database containing preauthorization details of requesters, to allow for automatic approval of subscription requests or profile update requests by preauthorized requesters.

36. The computing system of claim 22 wherein an audit log is maintained with respect to any changes to any subject information elements and profile records in the profile database.

37. A computing system comprising:
one or more processors;
one or more memories; and
one or more computer-readable hardware storage devices, the one or more computer-readable hardware storage devices containing program code executable by the one or more processors via the one or more memories to provide intermediated access and updates to centrally maintained information profiles of subject entities via a computer network and to cause the one or more computer-readable hardware storage devices of a profile server on a computer network to provide a profile database for the provision of intermediated information elements of subject entities to permitted subscribers, said database capable of connection to a subscriber device via a profile server connected to the same computer network, the profile server containing an intermediation software applications capable of managing said database and said database comprising:

a) a plurality of profile records each corresponding to a subject entity, each profile record containing at least one a plurality of subject information elements with each of the plurality of subject information elements being a field containing information pertaining to the subject entity; and
b) a plurality of subscription records each corresponding to an approved connection between a subscriber and at least one subject information element of a profile record in the profile database, being subscribed information elements,
wherein upon receipt by the profile server of a subscription request from a requester device, being a request seeking on behalf of an entity seeking to be a subscriber of at least one subject information element of a profile record, the intermediation software application will facilitate the execution of a subscription approval transaction by:
a) identifying a subject entity device of the subject entity associated with the related profile record, said subject entity device having a human interface for operation by a human operator;
b) transmitting a subscription approval request including the details of subject information elements sought to be subscribed and the subscriber seeking access to same to said subject entity device;
c) facilitating the display of the details of the subscriber seeking access and the subject information elements sought to be subscribed via the human interface of the subject entity device to a human operator on behalf of the subject entity and permitting the human operator to approve or reject the subscription request via the human interface;
d) receiving a subscription request response back from the subject entity device indicating the approval or rejection of the subscription request in respect of the particular subscriber and subject information elements, following the approval or rejection of same by the human operator at the human interface of the subject entity device;
e) receiving the subscription request response from said subject entity device at the profile server; and
f) using the intermediation software application to create a subscription record detailing any approved connection between an approved subscriber and subscribed information elements,
wherein upon receipt by the profile server of a profile update request form a requester device, being a request by a requester to post an update to a profile record by modifying the subject information elements attached to said record or their contents, the intermediation software application will facilitate the execution of an update approval transaction by:
a) identifying a subject entity device of the subject entity associated with the related profile record, said subject entity device having a human interface for operation by a human operator;
b) transmitting an update approval request including the details of the subject information elements sought to be modified and the requester seeking to update same to said subject entity device;
c) facilitating the display of the details of the requester and changes sought to be made to the subject information elements via the human interface of the subject entity device to a human operator on behalf of the subject entity and permitting the human operator to approve or reject the update request via the human interface;
d) receiving an update approval response indicating an approval or rejection of the profile update request based upon the interaction of the human operator with the subject entity device; and
e) if the received update approval response approves the profile update request, posting the approved modifications to the associated profile record,
wherein the contents of at least one subscribed information element will be provided to the subscriber device of a subscriber identified in a subscription record on detection by the profile server of the existence of an information retrieval condition; and
wherein no subscription records to particular information elements will be created, and no profile records will be updated, without approval of said subscriptions or changes by a human operator on behalf of the subject entity.

38. The computing system of claim 37 wherein the profile database comprises a single data structure connected to the profile server.

39. The computing system of claim 37 wherein the profile database comprises:
a) a distributed dataset with portions of the database resident on multiple host devices accessible to the profile server via the network; and
b) a centralized data schema or processor instructions to allow the profile server and the intermediation software application to access and update the distributed dataset.

40. The computing system of claim 37 wherein the database further comprises a plurality of requester records each corresponding to a requester in respect of whom subscription requests or profile update requests will be automatically approved.

* * * * *